United States Patent
Tsusaka et al.

(10) Patent No.: US 10,512,577 B2
(45) Date of Patent: Dec. 24, 2019

(54) ROBOT, METHOD FOR CONTROLLING ROBOT, RECORDING MEDIUM, AND METHOD

(71) Applicant: Panasonic Intellectual Property Management Co., Ltd., Osaka (JP)

(72) Inventors: Yuko Tsusaka, Osaka (JP); Yasunao Okazaki, Shiga (JP); Takahiro Shiwa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 291 days.

(21) Appl. No.: 15/409,502

(22) Filed: Jan. 18, 2017

(65) Prior Publication Data

US 2017/0216120 A1     Aug. 3, 2017

(30) Foreign Application Priority Data

Jan. 29, 2016 (JP) ................................ 2016-016694

(51) Int. Cl.
  *G05B 19/18* (2006.01)
  *G05B 19/04* (2006.01)
  (Continued)

(52) U.S. Cl.
  CPC .............. *A61G 7/1017* (2013.01); *A61G 5/14* (2013.01); *B25J 5/007* (2013.01); *B25J 11/009* (2013.01); *B25J 13/06* (2013.01)

(58) Field of Classification Search
  CPC ......... A61G 7/1017; A61G 5/14; B25J 5/007; B25J 13/06; B25J 11/009
  See application file for complete search history.

(56) References Cited

U.S. PATENT DOCUMENTS 9,833,896 B2 * 12/2017 Kim ...................... B25J 9/1633
2005/0204438 A1 * 9/2005 Wang ........................ B25J 5/00
455/67.7

(Continued)

FOREIGN PATENT DOCUMENTS

JP   11-267074   10/1999
JP   2002-244731   8/2002

(Continued)

*Primary Examiner* — Khoi H Tran
*Assistant Examiner* — Jorge O Peche
(74) *Attorney, Agent, or Firm* — Wenderoth, Lind & Ponack, L.L.P.

(57) ABSTRACT

A robot includes a motion mechanism capable of operating in accordance with each of a first motion pattern for supporting a user with a first motion representing a standing-up motion and a second motion pattern for supporting a user with a second motion representing a sitting-down motion, a battery that supplies electric energy to the motion mechanism, a control unit that determines a multiple-motion availability index indicating the availability of an operation in accordance with a multiple-motion pattern including the first and second motion patterns on the basis of the battery level and the amounts of energy charge in the battery required for the operations performed by the motion mechanism in accordance with the first and second motion patterns if the control unit detects that the battery level is a first threshold value or lower, and a presentation unit that presents the multiple-motion availability index determined by the control unit.

13 Claims, 18 Drawing Sheets

(51) Int. Cl.
*A61G 7/10* (2006.01)
*B25J 11/00* (2006.01)
*A61G 5/14* (2006.01)
*B25J 5/00* (2006.01)
*B25J 13/06* (2006.01)

(56) References Cited

U.S. PATENT DOCUMENTS

| | | | | |
|---|---|---|---|---|
| 2012/0023661 A1* | 2/2012 | Ota | ................. | A61G 7/1017 5/86.1 |
| 2014/0009561 A1* | 1/2014 | Sutherland | ............... | B25J 5/007 348/14.05 |
| 2014/0142475 A1* | 5/2014 | Goldfarb | .................. | A61H 3/00 601/35 |
| 2015/0190927 A1* | 7/2015 | Sutherland | ............... | H04W 4/70 700/259 |
| 2016/0067061 A1* | 3/2016 | Nagarajan | .............. | B25J 9/0006 623/24 |
| 2016/0199238 A1* | 7/2016 | Yamada | ................... | A47C 7/56 700/258 |
| 2017/0035631 A1* | 2/2017 | Tsusaka | ................... | B25J 19/06 |
| 2017/0128292 A1* | 5/2017 | Tsusaka | ................... | A61G 5/14 |
| 2017/0128293 A1* | 5/2017 | Tsusaka | ................... | A61G 5/00 |
| 2017/0225336 A1* | 8/2017 | Deyle | ............. | G08B 13/19647 |
| 2017/0269607 A1* | 9/2017 | Fulop | ..................... | B25J 9/0006 |
| 2017/0312153 A1* | 11/2017 | Paul | ...................... | A61F 5/0123 |
| 2018/0050449 A1* | 2/2018 | Stefan | ...................... | B60N 2/90 |
| 2018/0071874 A1* | 3/2018 | Bergeron | ................ | B23Q 1/54 |
| 2019/0015993 A1* | 1/2019 | Kunitake | ................. | B25J 5/007 |
| 2019/0054335 A1* | 2/2019 | Yeh | .................... | A63B 21/0087 |
| 2019/0072975 A1* | 3/2019 | Choi | ........................ | A47L 9/28 |

FOREIGN PATENT DOCUMENTS

| | | |
|---|---|---|
| JP | 2006-150562 | 6/2006 |
| JP | 2007-147434 | 6/2007 |
| JP | 2009-031992 | 2/2009 |
| JP | 2011-019571 | 2/2011 |
| JP | 2013-158386 | 8/2013 |

* cited by examiner

FIG. 5

| TIME (msec) | POSITION (m) | INITIAL POSITION FLAG | PROGRESS INFORMATION |
|---|---|---|---|
| t0 | p0 | 0 | 0 |
| t1 | p1 | 1 | 1 |
| t2 | p2 | 0 | 0 |
| .. | .. | .. | .. |
| tn | p10 | 0 | 0 |
| tn+1 | p11 | 0 | 0 |
| ⋮ | ⋮ | ⋮ | ⋮ |

FIG. 6A

|  | BATTERY LEVEL (Ah) |
|---|---|
| FIRST THRESHOLD VALUE FOR STANDING-UP MOTION | ALU1 |
| SECOND THRESHOLD VALUE FOR STANDING-UP MOTION | ALU2 |
| FIRST THRESHOLD VALUE FOR SITTING-DOWN MOTION | ALD1 |
| SECOND THRESHOLD VALUE FOR SITTING-DOWN MOTION | ALD2 |
| FIRST THRESHOLD VALUE FOR WALKING MOTION | ALW1 |
| SECOND THRESHOLD VALUE FOR WALKING MOTION | ALW2 |

FIG. 6B

|  | REQUIRED AMOUNT OF ENERGY CHARGE (Ah) |
|---|---|
| STANDING-UP MOTION | AU |
| SITTING-DOWN MOTION | AD |
| WALKING MOTION | AW |

ROBOT, METHOD FOR CONTROLLING ROBOT, RECORDING MEDIUM, AND METHOD

BACKGROUND

1. Technical Field

The present disclosure relates to a robot for supporting a user with a motion, a method for controlling a robot, a recording medium, and a method.

2. Description of the Related Art

Standing-up motion support robots for supporting a care receiver with a standing-up motion have been developed (refer to, for example, Japanese Unexamined Patent Application Publication No. 2013-158386). The standing-up motion support robot described in Japanese Unexamined Patent Application Publication No. 2013-158386 includes a holding portion for holding the body of a care receiver, a main robot body for supporting the care receiver with the standing-up motion, and a controller for controlling the operation performed by an instruction unit in accordance with the amount of operation performed by an operator.

SUMMARY

However, further improvement is required for robots that support a care receiver with the motion to provide the information regarding the condition of the robot.

In one general aspect, the techniques disclosed here feature a robot including a motion mechanism capable of operating in accordance with each of a first motion pattern for supporting a care receiver with a first motion representing a standing-up motion and a second motion pattern for supporting the care receiver with a second motion representing a sitting-down motion, a power source that supplies electric energy to the motion mechanism, a control unit that determines a multiple-motion support operation availability index indicating the availability of an operation in accordance with a multiple-motion pattern including the first motion pattern and the second motion pattern on the basis of the level of energy charge in the power source, an amount of energy charge required for the operation performed by the motion mechanism in accordance with the first motion pattern, and an amount of energy charge required for the operation performed by the motion mechanism in accordance with the second motion pattern if the control unit detects that the level of energy charge in the power source is lower than or equal to a first threshold value, and a presentation unit that presents the multiple-motion support operation availability index determined by the control unit.

According to the above-described aspect, further improvement of the robots can be provided.

It should be noted that general or specific embodiments may be implemented as a system, a method, an integrated circuit, a computer program, a computer-readable recording medium, or any selective combination thereof. Examples of the computer-readable medium include a nonvolatile recording medium, such as a compact disk-read only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 illustrates an example of the information stored in a motion information database according to the exemplary embodiment;

FIG. 6A illustrates a first example of the information stored in a battery information database according to the exemplary embodiment;

FIG. 6B illustrates a second example of the information stored in the battery information database according to the exemplary embodiment;

DETAILED DESCRIPTION

Figure 1A:
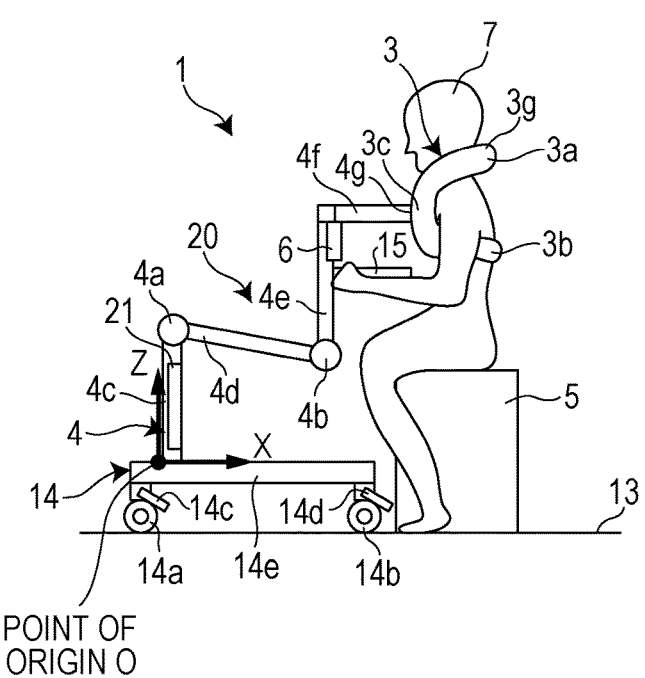
FIG. 1A is a schematic side view of the configuration of a robot and a care receiver according to an exemplary embodiment.

Underlying Knowledge Forming Basis of the Present Disclosure

A key point of an aspect of the present disclosure is described first.

Japanese Unexamined Patent Application Publication No. 2013-158386 describes a standing-up motion support robot including a holding portion for holding the body of a care receiver, a main robot body for supporting the care receiver with the standing-up motion, and a controller for controlling the operation of the holding unit in accordance with the amount of operation performed by an operator. In addition, Japanese Unexamined Patent Application Publication No. 2013-158386 describes a manual pulse generator as an example of the controller. The manual pulse generator includes a dial, an emergency stop button, a generator body, a turnover switch, and an auto mode enable switch (refer to Paragraph [0031] and FIG. 2 in Japanese Unexamined Patent Application Publication No. 2013-158386).

Japanese Unexamined Patent Application Publication No. 2013-158386 does not describe whether the power source of the standing-up motion support robot is a rechargeable battery and whether the battery level is displayed on the manual pulse generator. That is, since Japanese Unexamined Patent Application Publication No. 2013-158386 does not even describe whether the battery level is displayed on the manual pulse generator, the publication does not describe an operation to display information about the number of times or the duration the robot is able to support a user with a standing-up motion in accordance with the battery level.

Japanese Unexamined Patent Application Publication No. 2007-147434 describes a method for displaying the battery level of a battery embedded in a mobile wireless communication terminal having wireless transmission capability, such as a terminal used in a restraint. The mobile wireless communication terminal converts the battery level of the embedded battery into the number of times that the mobile wireless communication terminal is able to wirelessly transmit information and displays the number.

The mobile wireless communication terminal described in Japanese Unexamined Patent Application Publication No. 2007-147434 is used to perform a simplified and single operation to transmit, for example, orders of customers to the kitchen in a restaurant. That is, the mobile wireless communication terminal described in the publication does not perform a plurality of types of operations, the publication does not describe a process to determine the number of times that the mobile wireless communication terminal can perform the operation for each of functions in accordance with the battery level and display the number for each of the functions.

Accordingly, the present inventors have conceived the idea of the following aspects of the present disclosure.

According to an aspect of the present disclosure, a robot includes a motion mechanism capable of operating in accordance with each of a first motion pattern for supporting a care receiver with a first motion representing a standing-up motion and a second motion pattern for supporting the care receiver with a second motion representing a sitting-down motion, a power source that supplies electric energy to the motion mechanism, a control unit that determines a multiple-motion support operation availability index indicating the availability of an operation in accordance with a multiple-motion pattern including the first motion pattern and the second motion pattern on the basis of the level of energy charge in the power source, an amount of energy charge required for the operation performed by the motion mechanism in accordance with the first motion pattern, and an amount of energy charge required for the operation performed by the motion mechanism in accordance with the second motion pattern if the control unit detects that the level of energy charge in the power source is lower than or equal to a first threshold value, and a presentation unit that presents the multiple-motion support operation availability index determined by the control unit.

In general, when a robot operates to support a care receiver with a motion, motions in accordance with a plurality of motion patterns are sequentially performed. For example, when the robot supports a care receiver with movement from a bed to a toilet, three motions, that is, a motion in accordance with a motion pattern for supporting the care receiver with a standing-up motion, a motion pattern for supporting the care receiver with a walking motion, and a motion pattern for supporting the care receiver with a sitting-down motion, are sequentially performed. At that time, it is highly likely that a message prompting battery charge is presented during a motion in accordance with the motion pattern which greatly consumes battery power. As used herein, the term "standing-up motion" refers to a motion which starts in a sitting posture and finishes in a standing posture, and the term "sitting-down motion" refers to a motion which starts in a standing posture and finishes in a sitting posture.

However, even when a message prompting to charge a battery of the robot is presented to a care receiver who is moving to a toilet, it is difficult for the care receiver to immediately charge the battery.

According to the aspect of the present disclosure, if the battery level reaches a value lower than or equal to the first threshold value, the operation availability index for the multiple-motion pattern is presented. The multiple-motion pattern includes a first motion pattern indicating a standing-up motion and a second motion indicating a sitting-down motion. For example, when the number of times is presented as the index, the number of times that the operation can be performed in accordance with the multiple-motion pattern is presented. Thus, the care receiver can easily determine whether the amount of battery charge sufficient for the robot to support with the plurality of motions (the multiple motions) is remaining in the battery. As a result, the care receiver can easily make a plan of when to recharge the battery. For example, before moving to a toilet, the care receiver can recharge the battery in advance. Thus, the use of the robot becomes more convenient.

In addition, in the above-described aspect, for example, if the control unit detects that the level of energy charge in the power source is lower than or equal to the first threshold value during an operation performed by the motion mechanism in accordance with one of the first motion pattern and the second motion pattern, the presentation unit may present the multiple-motion support operation availability index determined by the control unit after the operation is completed.

Since a robot consumes the energy charge in the power source during a motion in accordance with each of the motion patterns, it is highly likely that the level of energy charge in the power source reaches a value lower than or equal to the first threshold value during a motion in accordance with any one of the motion patterns. In such a case, if the number of times the operation in accordance with each of the motion patterns be performed is presented during a motion in accordance with some motion pattern, it is difficult for the caregiver or the care receiver to determine whether the motion currently performed is counted in the number of times and, thus, it is difficult to make a plan of when to recharge the battery of the robot.

According to the present aspect, if the battery level reaches a value lower than or equal to the first threshold value during an operation in accordance with each of the motion patterns, the operation availability index for the motion pattern is presented after the operation is completed. That is, during the motion in accordance with the motion pattern, the operation availability index for the motion pattern is not presented. Accordingly, the caregiver or the care receiver, for example, can count the number of motions after the number of times for the motion is presented. As a result, the caregiver or the care receiver can easily make a plan of when to recharge the battery of the robot.

In addition, in the above-described aspect, for example, if the control unit detects that the level of energy charge in the power source is lower than or equal to the first threshold value during an operation to be performed by the motion mechanism in accordance with one of the first motion pattern and the second motion pattern before the operation is performed, the presentation unit may present at least one of the indices determined by the control unit before the operation is performed.

Since a robot consumes the energy charge in the power source during an operation in accordance with each of the motion patterns, it is highly likely that the level of the energy charge in the battery reaches a value lower than or equal to the first threshold value during a motion in accordance with any one of the motion patterns. In such a case, if the number of times the operation in accordance with each of the motion patterns be performed is presented during an operation in accordance with some motion pattern, it is difficult for the caregiver or the care receiver to determine whether the motion currently performed is counted in the number of times and, thus, it is difficult to make a plan of when to recharge the battery.

According to the present aspect, if it is detected that the battery level reaches a value lower than or equal to the first threshold value during an operation in accordance with each of the motion patterns in advance, the operation availability index for the motion pattern is presented before the operation starts. That is, presentation of the operation availability index for each of the motion patterns is prevented during the operation in accordance with the motion pattern. Accordingly, for example, after the number of times the operation can be performed is presented for each of the motion patterns, the caregiver or the care receiver can count the number of times remaining. As a result, the caregiver or the care receiver can easily make a plan of when to recharge the battery of the robot.

In addition, in the above-described aspect, for example, the motion mechanism may be further capable of operating in accordance with a third motion pattern for supporting the care receiver with a third motion. If the control unit detects that the level of energy charge in the power source reaches a value lower than or equal to a second threshold value that is lower than the first threshold value during the operation performed by the motion mechanism in accordance with one of the first motion pattern and the second motion pattern, the control unit may stop the operation performed by the motion mechanism and may cause the motion mechanism to operate in accordance with the third motion pattern.

If the battery level is depleted during the operation in accordance with any one of the motion patterns, the robot abruptly and completely halts. As used herein, the term "complete halt" refers to halting of the robot with no force applied to the care receiver as a result of stoppage of supplying electric power to the robot. For example, if the robot completely halts while supporting the care receiver with the standing-up motion, the care receiver needs to maintain their posture with their own muscle power, since the robot applies no force to the care receiver.

According to the present aspect, if the battery level reaches a value lower than or equal to the second threshold value during an operation in accordance with each of the motion patterns, the robot operates in accordance with the third motion pattern for supporting the care receiver with a third motion. In this manner, the abrupt and complete halt of the robot can be prevented.

In addition, in the above-described aspect, for example, the third motion pattern may include a motion pattern to temporarily maintain the position of the motion mechanism.

According to the present aspect, if the battery level reaches a value lower than or equal to the second threshold value during the operation in accordance with any one of the motion patterns, the robot temporarily halts the motion mechanism, that is, the robot temporarily maintains the position of the motion mechanism. As used herein, the term "temporary halt of a robot" refers to maintaining the position and posture of the robot and the care receiver by supplying power to the robot to apply a force to the care receiver. For example, if the robot temporarily halts during the operation for supporting the care receiver with the standing-up motion, the robot maintains the position and posture of the robot and the care receiver. As a result, the posture of the care receiver when the robot halts is maintained.

In addition, in the above-described aspect, for example, the second threshold value may be lower than the amount of energy charge required to perform an operation once by the motion mechanism in accordance with one of the first motion pattern and the second motion pattern and may be higher than or equal to an amount of energy charge required to perform an operation once by the motion mechanism in accordance with the third motion pattern.

In addition, in the above-described aspect, for example, the first index and the second index may be the number of times the motion mechanism is operable in accordance with the first motion pattern and the second motion pattern, respectively, by using the energy charge remaining in the power source when the control unit acquires the level of the energy charge.

According to the present aspect, the robot is capable of giving a particular presentation of the first index and the second index by using the number of times that the motion mechanism is operable.

In addition, in the above-described aspect, for example, the first index and the second index may be the duration the motion mechanism is operable in accordance with the first motion pattern and the second motion pattern, respectively, by using the energy charge remaining in the power source when the control unit acquires the level of the energy charge.

According to the present aspect, the robot is capable of giving a particular presentation of the first index and the second index by using the duration during which the motion mechanism is operable.

In addition, in the above-described aspect, for example, the first index and the second index may be information indicating that the motion mechanism can perform an operation at least once in accordance with the first motion pattern and the second motion pattern or information indicating that the motion mechanism cannot perform the operation, respectively, by using the battery charge remaining when the control unit acquires the level of the energy charge.

According to the present aspect, the robot is capable of giving a particular presentation of the first index and the second index by using the information as to whether the motion mechanism is operable or not.

In addition, in the above-described aspect, for example, the robot may further include an input receiving unit that receives an input for causing the motion mechanism to operate in accordance with one of the first motion pattern and the second motion pattern. If the input receiving unit receives the input, the motion mechanism may operate in accordance with part of the first pattern or part of the second pattern determined by the received input. Upon detecting that the level of energy charge in the power source reaches a value lower than or equal to the first threshold value, the control unit may determine at least one of the indices, and the presentation unit may present the at least one of indices.

According to the present aspect, the robot operates so as to perform a motion pattern only when the robot is receiving the operation input to the robot. In this case, the robot can give a presentation when the energy charge remaining in the battery reaches a value lower than or equal to the first threshold value during the operation.

In addition, in the above-described aspect, for example, the robot may further include a movement mechanism that moves the robot and a brake that prevents the movement mechanism from moving. The presentation unit may present the at least one of indices when the brake prevents the movement mechanism from moving or when the brake finishes the prevention.

According to the present aspect, in the case where the robot is used as a caster walker to support the care receiver with a walking motion, the robot can give a presentation before and after the walking motion is performed.

According to another aspect of the present disclosure, a method for controlling a robot is provided. The robot includes a motion mechanism capable of operating in accordance with each of a first motion pattern for supporting a care receiver with a first motion representing a standing-up motion and a second motion pattern for supporting the care receiver with a second motion representing a sitting-down motion and a power source that supplies electric energy to the motion mechanism. The method includes determining a multiple-motion support operation availability index indicating the availability of an operation in accordance with a multiple-motion pattern including the first motion pattern and the second motion pattern on the basis of the level of energy charge in the power source, an amount of energy charge required for the operation performed by the motion mechanism in accordance with the first motion pattern, and an amount of energy charge required for the operation performed by the motion mechanism in accordance with the second motion pattern if the control unit detects that the level of energy charge in the power source is lower than or equal to a first threshold value and presenting at least one of the determined indices.

According to still another aspect of the present disclosure, a program is provided. The program causes a computer to perform the above-described method.

It should be noted that general or specific embodiments may be implemented as a system, a method, an integrated circuit, a computer program, a computer-readable recording medium, such as a CD-ROM, or any selective combination thereof.

Exemplary embodiments are described in detail below with reference to the accompanying drawings.

Note that each of the embodiments described below is a general or specific example of the present disclosure. A value, a shape, a material, a constituent element, the positions and the connection form of the constituent elements, steps, and the sequence of steps described in the embodiments are only examples and shall not be construed as limiting the scope of the present disclosure. In addition, among the constituent elements in the embodiments described below, the constituent element that does not appear in an independent claim, which has the broadest scope, is described as an optional constituent element.

Exemplary Embodiments

Figure 1B:
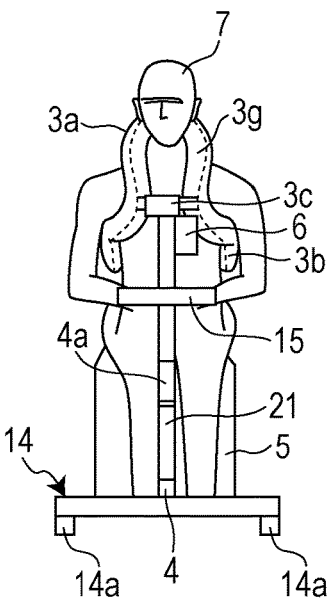
FIG. 1B is a schematic front view of the configuration of the robot and a care receiver in a sitting posture according to the exemplary embodiment.

FIGS. 1A and 1B illustrate an example of motion support provided by a robot system 1 according to the present exemplary embodiment. The robot system 1 supports a care receiver 7 with at least one of a standing-up motion, a walking motion, and a sitting-down motion. An example of the care receiver 7 is an aged user. In addition, examples of the care receiver 7 include a sick person and a user having difficulty moving in daily activities as a result of injury.

The robot system 1 illustrated in FIGS. 1A and 1B is an example of a system for supporting the care receiver 7 with a standing-up motion or a sitting-down motion. More specifically, the robot system 1 illustrated in FIGS. 1A and 1B supports the care receiver 7 with a motion that starts in the sitting posture and finishes in the standing posture ((hereinafter referred to as a "standing-up motion") or the motion which starts in a standing posture and finishes in a sitting posture (hereinafter referred to as a "sitting-down motion").

Figure 1C:
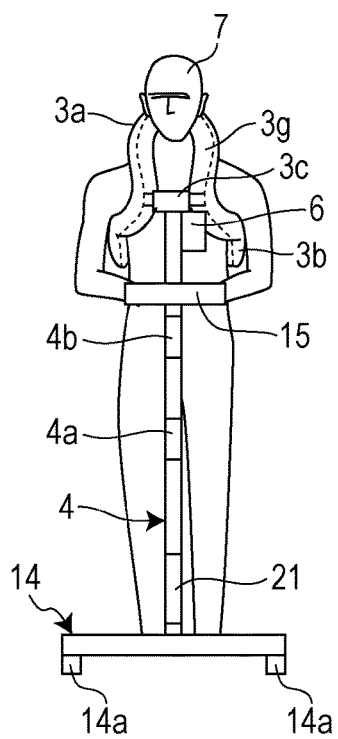
FIG. 1C is a schematic front view of the configuration of the robot and a care receiver in a standing posture according to the exemplary embodiment.

FIG. 1A is a side view of the care receiver 7 in the sitting posture, and FIG. 1B is a front view of the care receiver 7 in the sitting posture. In this example, the care receiver 7 in the sitting posture is the care receiver 7 sitting on a seat unit 5 placed on a floor 13. FIG. 1C is a front view of the care receiver 7 in a standing posture.

Note that as used herein, the term "standing-up motion" refers to part of the motion which starts in the sitting posture and finishes in the standing posture in addition to the entire motion. Similarly, the term "sitting-down motion" refers to part of the motion which starts in the standing posture and finishes in the sitting posture in addition to the entire motion.

Figure 2:
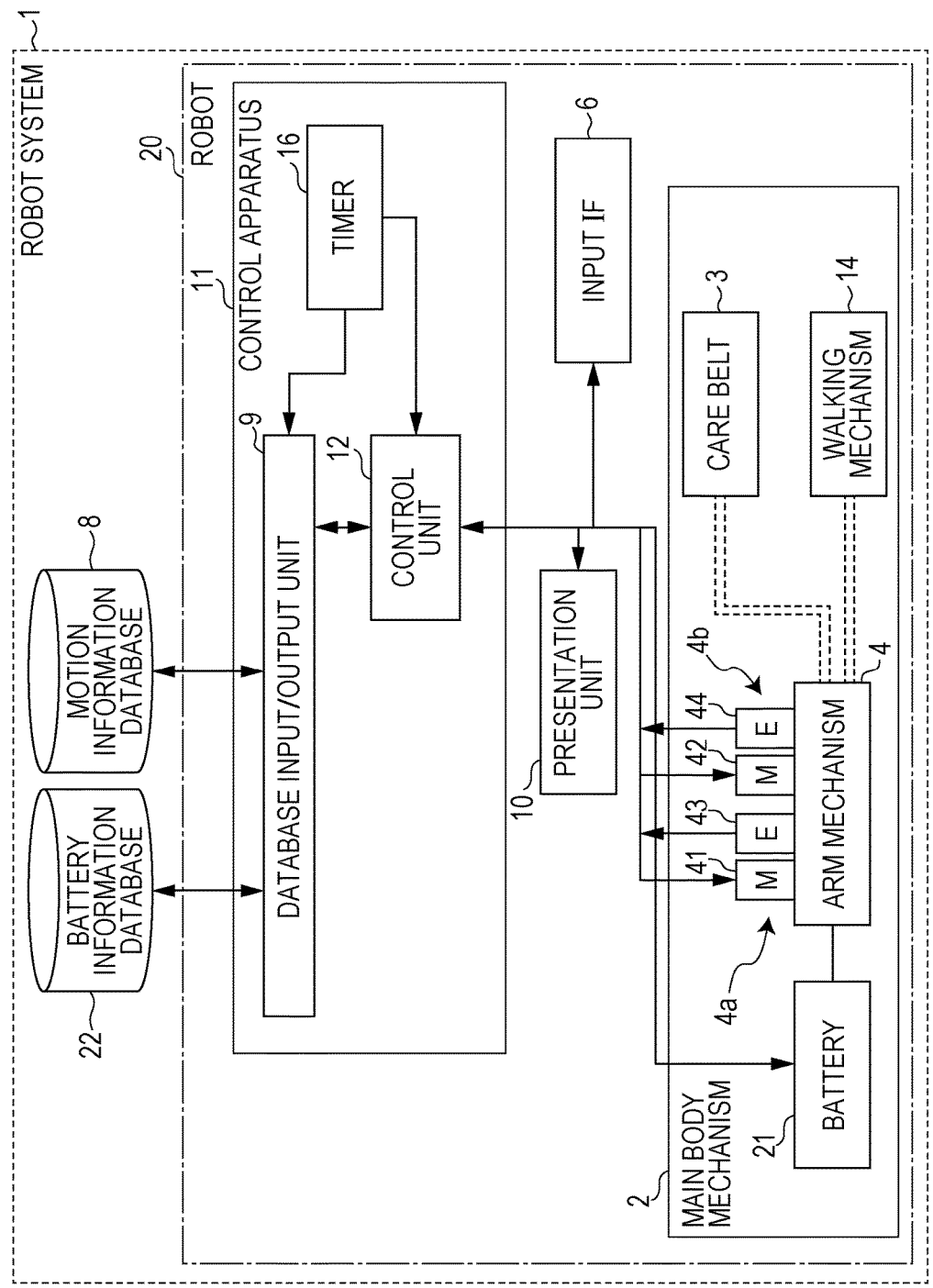
FIG. 2 is a block diagram illustrating a detailed configuration of a robot system according to an exemplary embodiment.

FIG. 2 is a block diagram illustrating a detailed configuration of the robot system 1 according to the present exemplary embodiment. As illustrated in FIG. 2, the robot system 1 includes a robot 20, a motion information database 8, and a battery information database 22. Note that the motion information database 8 and the battery information database 22 may be disposed inside the robot 20.

Figure 3A:
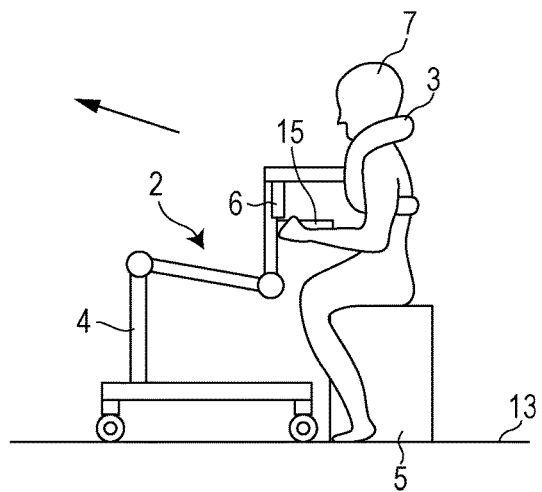
FIG. 3A is a first illustration of an example of a first motion pattern of a standing-up motion of a care receiver using the robot system according to the exemplary embodiment.
Figure 3B:
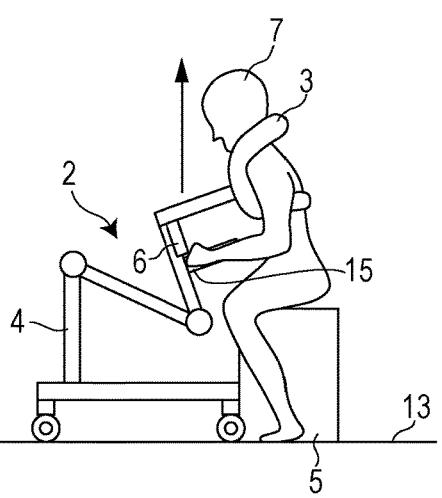
FIG. 3B is a second illustration of an example of the first motion pattern of the standing-up motion of the care receiver using the robot system according to the exemplary embodiment.
Figure 3C:
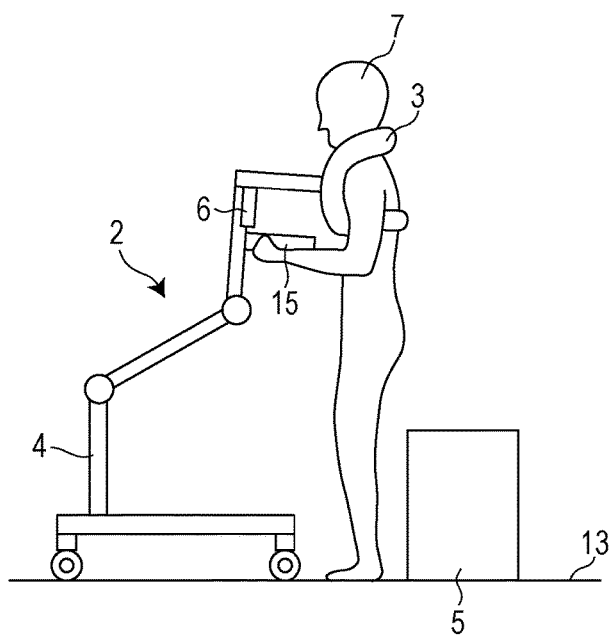
FIG. 3C is a third illustration of an example of the first motion pattern of the standing-up motion of the care receiver using the robot system according to the exemplary embodiment.
Figure 4A:
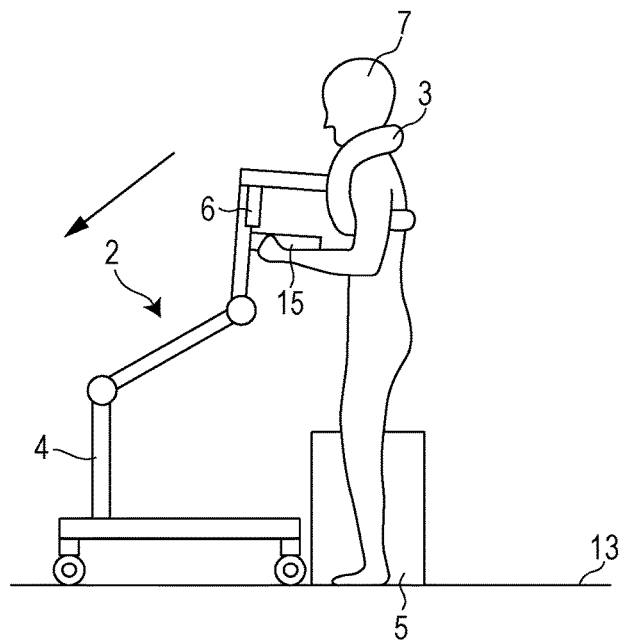
FIG. 4A is a first illustration of an example of a second motion pattern of the standing-up motion of a care receiver using the robot system according to the exemplary embodiment.
Figure 4B:
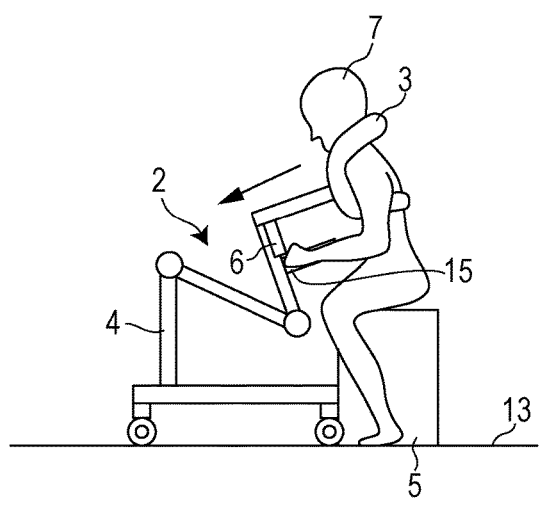
FIG. 4B is a second illustration of an example of the second motion pattern of the standing-up motion of the care receiver using the robot system according to the exemplary embodiment.
Figure 4C:
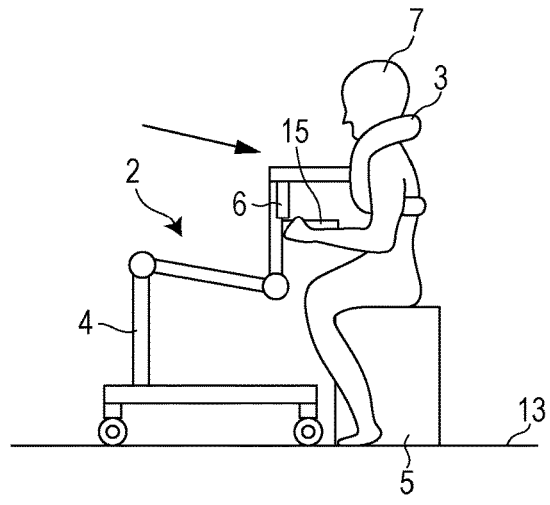
FIG. 4C is a third illustration of an example of the second motion pattern of the standing-up motion of the care receiver using the robot system according to the exemplary embodiment.

FIGS. 3A to 3C illustrate an example of a first motion pattern of the robot 20 in the standing-up motion (an example of a first motion) of the care receiver 7 using the robot system 1 according to the present exemplary embodiment. FIGS. 4A to 4C illustrate an example of a second motion pattern of the robot 20 in the sitting-down motion (an example of a second motion) of the care receiver 7 using the robot system 1 according to the present exemplary embodiment.

The robot 20 is placed on the floor 13. The robot 20 includes a main body mechanism 2, which is an example of a motion mechanism, a control apparatus 11, an input interface (IF) 6, which is an example of an instruction input apparatus, and a control unit 12.

The main body mechanism 2 includes an arm mechanism 4, a care belt 3, which is an example of a holding mechanism, a walking mechanism 14, and a battery 21. The arm mechanism 4 includes at least a robot arm, which is an example of a pull mechanism. Note that the main body mechanism 2 may have a configuration without the walking mechanism 14.

The control apparatus 11 includes a database input/output unit 9, a timer 16, and the control unit 12.

Care Belt

As illustrated in FIGS. 1A to 1C, the care belt 3 is attachable to the care receiver 7 to hold the care receiver 7. The care belt 3 includes a holding mechanism 3g and a connecting portion 3c. The care belt 3 is removably connected to the robot arm via the connecting portion 3c.

The holding mechanism 3g includes at least a first holding portion 3a and a second holding portion 3b.

The first holding portion 3a can hold at least one of the neck and the back of the care receiver 7.

The second holding portion 3b can hold the waist of the care receiver 7.

The connecting portion 3c can be positioned at the chest of the care receiver 7 when the holding mechanism 3g is attached to the care receiver 7. In addition, the connecting portion 3c connects the first holding portion 3a to the second holding portion 3b in front of the care receiver 7. The connecting portion 3c is connected to the holding mechanism 3g and is removably connectable to one end (e.g., the rear end) of the arm mechanism 4 (described in more detail below).

As illustrated in FIGS. 1A to 1C as an example, the connecting portion 3c is connected to one end of the arm mechanism 4 in the substantially middle of the chest of the care receiver 7, in the substantially middle of the first holding portion 3a and the second holding portion 3b, and near the position at which both ends of the first holding portion 3a are connected to both ends of the second holding portion 3b so as to bridge the two connected ends. The connecting portion 3c is connected to one end of the arm mechanism 4 by using, for example, a screw. However, any technique that can connect one end of the arm mechanism 4 to the connecting portion 3c may be employed.

Note that the connecting portion 3c may be formed from a material that is less expandable than the material of the first holding portion 3a and the second holding portion 3b. In this manner, when the care belt 3 is pulled by the arm mechanism 4, expansion of the connecting portion 3c can be prevented. Accordingly, the external force from the arm mechanism 4 can be reliably transferred to the body of the care receiver 7 via the holding mechanism 3g. Thus, the arm mechanism 4 is connected to the connecting portion 3c of the care belt 3, and the care belt 3 operates so as to move in accordance with the motion pattern. In this way, the arm mechanism 4 pulls the care belt 3.

Walking Mechanism

The walking mechanism 14 includes a rectangular stand 14e, a pair of front wheels 14a, a pair of rear wheels 14b, a front wheel brake 14c, and a rear wheel brake 14d. The walking mechanism 14 is placed on the floor 13. Each of the two front wheels 14a is rotatably disposed at one of two front end corners of the rectangular stand 14e. Each of the two rear wheels 14b is rotatably disposed at one of two rear end corners of the rectangular stand 14e. The front wheel brake 14c applies a braking force to the front wheels 14a. The rear wheel brake 14d applies a braking force to the rear wheels 14b. The walking mechanism 14 includes the arm mechanism 4 in the upper portion thereof. That is, the arm mechanism 4 is supported in an upright position in the middle of the front portion of the rectangular stand 14e. The walking mechanism 14 corresponds to a moving mechanism.

As an example, the front wheels 14a and the rear wheels 14b are rotated under the condition illustrated in FIG. 3C by the care receiver 7 applying a force to the robot 20 in the front direction (e.g., the left direction in FIG. 3C) and, thus, the robot 20 can serve as a caster walker that supports the care receiver 7 with the walking motion. While the example has been described with reference to the front wheels 14a and the rear wheels 14b rotated by the care receiver 7 pushing the robot 20, at least one of the pair of front wheels 14a and the pair of rear wheels 14b may include, for example, a motor so that the pushing force applied to the robot 20 by the care receiver 7 is increased. In this way, the care receiver 7 can easily move.

In addition, as an example, the front wheel brake 14c and the rear wheel brake 14d may be configured so as to be manually turned on and off (not illustrated in FIGS. 3A to 3C). Alternatively, the front wheel brake 14c and the rear wheel brake 14d may be configured so as to be turned on and off using an electric signal (e.g., an electromagnetic brake). By turning on the front wheel brake 14c or the rear wheel brake 14d, a braking force is applied to the front wheels 14a or the rear wheels 14b. Thereafter, by turning off the front wheel brake 14c or the rear wheel brake 14d, the braking force is released from the front wheels 14a or the rear wheels 14b. While the example has been described with reference to the configuration including the pair of front wheels 14a and the pair of rear wheels 14b, an additional wheel may be provided at the center of the rectangular stand 14e. Note that the number of the wheels and the size of each of the wheels are not limited to those illustrated in the drawing.

Arm Mechanism

The arm mechanism 4 is provided on the upper surface of the walking mechanism 14. The arm mechanism 4 is connected to the care belt 3. More specifically, the top end of the arm mechanism 4 is connected to the holding mechanism 3g via the connecting portion 3c. The arm mechanism 4 operates in accordance with a motion pattern for supporting the care receiver 7 with at least one of the standing-up motion and the sitting-down motion under the control of the control unit 12.

As an example, the arm mechanism 4 is formed as a robot arm having two degrees of freedom. The arm mechanism 4 includes a first motor 41, a first encoder 43 that detects the rotational speed (e.g., the angle of rotation) of the rotation shaft of the first motor 41, a second motor 42, and a second encoder 44 that detects the rotational speed (e.g., the angle of rotation) of the rotation shaft of the second motor 42. The information regarding the angles of rotation received from the first encoder 43 and the second encoder 44 is converted into the positional information regarding the arm mechanism 4. The control apparatus 11 controls the first motor 41 and the second motor 42 on the basis of the positional information so that the arm mechanism 4 operates in accordance with the motion pattern for supporting the care receiver 7 with the standing-up motion or the sitting-down motion. The position identified by the positional information may be the position of a predetermined portion of the arm mechanism 4 (e.g., the position of one end of the arm mechanism 4 to be connected to the connecting portion 3c).

The operation of the arm mechanism 4 is described below with reference to an example of a motion pattern (for supporting the care receiver 7 with a standing-up motion which starts in the sitting posture illustrated in FIG. 3A and finishes in the standing posture illustrated in FIG. 3C). In this example, the operation to support with a standing-up motion is performed until the hip of the care receiver 7 in a sitting posture rises from the seat unit 5. As illustrated in FIG. 3A, the arm mechanism 4 simultaneously pulls the first holding portion 3a and the second holding portion 3b of the holding mechanism 3g diagonally upward in front of the care receiver 7. Thereafter, as illustrated in FIG. 3B, the arm mechanism 4 pulls the care receiver 7 straight upward.

In addition, as another example of the motion pattern, as illustrated in FIGS. 4A to 4C, the robot system 1 is operated to support the care receiver 7 with the sitting-down motion in which the care receiver 7 in the standing posture is sitting down on the seat unit 5. To support with the sitting-down motion, the arm mechanism 4 simultaneously pulls the first holding portion 3a and the second holding portion 3b of the holding mechanism 3g in at least downward direction of the care receiver 7 and, thereafter, pulls the first holding portion 3a and the second holding portion 3b downward and slightly forward. Subsequently, the arm mechanism 4 pulls the first holding portion 3a and the second holding portion 3b downward and slightly rearward.

More specifically, the arm mechanism 4 is configured as a robot arm including a first arm 4c, a second arm 4d, a third arm 4e, a fourth arm 4f, a first drive unit 4a, and a second drive unit 4b. The lower end of the first arm 4c is secured to the rectangular stand 14e in the middle of the front portion of the rectangular stand 14e so as to be in an upright position. The front end of the second arm 4d is rotatably connected to the upper end of the first arm 4c via a first joint unit including the first drive unit 4a. The rear end of the second arm 4d is rotatably connected to the lower end of the third arm 4e via a second joint unit including the second drive unit 4b. The upper end of the third arm 4e is secured to the front end of the fourth arm 4f so that the axis directions of the third arm 4e and the fourth arm 4f are perpendicular to each other and, thus, the third arm 4e and the fourth arm 4f form an L shape. The rear end portion of the fourth arm 4f includes a connecting portion 4g removably connected to the connecting portion 3c of the care belt 3.

The first drive unit 4a is disposed in the first joint unit between the first arm 4c and the second arm 4d. The first drive unit 4a includes, for example, the first motor 41 that rotates the second arm 4d relative to the first arm 4c and the first encoder 43 that detects the information regarding the angle of rotation of the first motor 41. Accordingly, the control unit 12 (described below) can perform control so that the second arm 4d is driven to rotate at a predetermined angle relative to the first arm 4c. The second drive unit 4b is disposed in the second joint unit between the second arm 4d and the third arm 4e. The second drive unit 4b includes, for example, the second motor 42 that rotates the third arm 4e relative to the second arm 4d and the second encoder 44 that detects the information regarding the angle of rotation of the second motor 42. The information regarding the angles of rotation received from the first encoder 43 and the second encoder 44 is converted into the positional information regarding the arm mechanism 4 and is used as positional information by the control unit 12. In this manner, the third arm 4e can be driven so as to move to a desired position by rotating the third arm 4e at a predetermined angle relative to the second arm 4d under the control of the control unit 12 (described in more detail below).

A handle 15 is provided so as to protrude from the middle portion of the third arm 4e rearward (e.g., toward the care receiver 7). The care receiver 7 can hold the handle 15 in both hands when the care receiver 7 is in a sitting posture or stands up. Note that the handle 15 may have a length so that the care receiver 7 can place their arm on it. In this manner, the handle 15 functions as a handle when the care receiver 7 stands up and functions as an armrest on which the arm of the care receiver 7 is placed when the care receiver 7 is walking. Thus, the care receiver 7 can walk more stably. In addition, the fourth arm 4f may have a cushioning material, such as urethane. In this manner, even when the care receiver 7 falls forward and, therefore, the face or the upper body of the care receiver 7 collides with the fourth arm 4f, the impact can be reduced.

Note that when the input IF 6 receives an instruction that is input to operate the arm mechanism 4, the arm mechanism 4 may be controlled so as to operate in accordance with only part of a motion pattern determined by the input instruction (known as "hold-to-run control").

Input IF

The input interface (input IF) 6 (e.g., an operation panel having, for example, buttons thereon) is, for example, removably provided so as to protrude downward from the front portion of the fourth arm 4f. By disposing the input IF 6 in this manner, the care receiver 7 in the sitting posture can operate the input IF 6 from the side of the arm mechanism 4. Note that the input IF 6 corresponds to an input receiving unit.

The input IF 6 can receive a standing-up instruction that is input to operate the arm mechanism 4 in accordance with a motion pattern for supporting the care receiver 7 with the standing-up motion (e.g., a first instruction input) or a sitting-down instruction that is input to operate the arm mechanism 4 in accordance with a motion pattern for supporting the care receiver 7 with the sitting-down motion (e.g., a second instruction input).

Figure 7A:
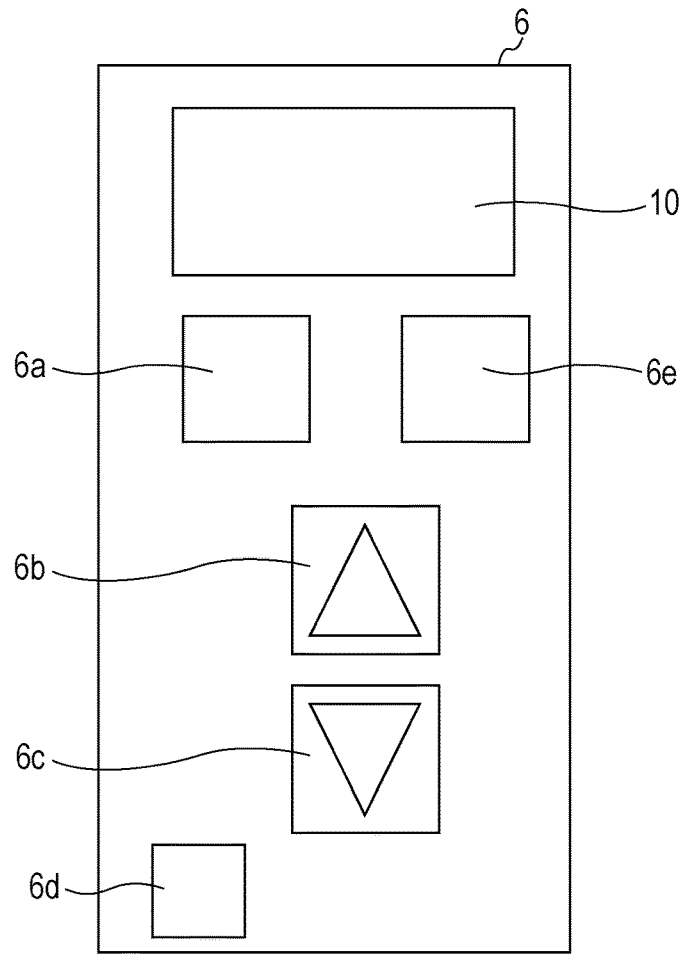
FIG. 7A is a schematic illustration of an input IF and a presentation unit according to the exemplary embodiment.

An example of the input IF 6 is illustrated in FIG. 7A. The input IF 6 includes a power button 6a, an "Up" button 6b, a "Down" button 6c, a brake button 6d, and a return-to-initial-position button 6e. Each of the buttons of the input IF 6 can be operated by the care receiver 7 or a caregiver. Note that the input IF 6 may or may not have a presentation unit 10 illustrated in FIG. 7A.

The power button 6a is a button for power on or off the robot system 1. For example, if the power button 6a is pushed in, the power is turned on. In contrast, if the power button 6a is pulled back, the power is turned off.

The "Up" button 6b is used to operate the arm mechanism 4 to support the care receiver 7 with the standing-up motion. If the "Up" button 6b is operated, the arm mechanism 4 operates in accordance with the motion pattern for supporting the care receiver 7 with the standing-up motion.

The "Down" button 6c is used to operate the arm mechanism 4 to support the care receiver 7 with the sitting-down motion. If the "Down" button 6c is operated, the arm mechanism 4 operates in accordance with the motion pattern for supporting the care receiver 7 with the sitting-down motion.

The brake button 6d is used to turn on and off the brakes of the front wheels 14a and the rear wheels 14b.

The return-to-initial-position button 6e is used to move the arm mechanism 4 to the initial position.

An example of the initial position of the arm mechanism 4 is a position close to the front of the body of the care receiver 7, as illustrated in FIG. 3A. In addition, for example, the input IF 6 may be removable from the front portion of the fourth arm 4f to function as a remote controller. That is, the caregiver can hold the input IF 6 with their hands and operate the input IF 6. In this description, the initial position is an example of a connection point at which the arm mechanism 4 can be connected to the connecting portion 3c of the care belt 3. If the return-to-initial-position button 6e is operated, the arm mechanism 4 moves to the initial position, which is an example of the connection point, under the control of the control unit 12. Thereafter, the input IF 6 is enabled to receive an instruction input thereto.

Battery

The battery 21 supplies electric power to the arm mechanism 4, the care belt 3, and other units. The battery 21 corresponds to a power source.

Battery Information Database

The battery information database 22 stores a variety of threshold values used by the control unit 12 to detect whether the battery level (the amount of energy charge in the battery 21) is a threshold value or lower. As illustrated in FIG. 6A, the battery information database 22 stores a first threshold value and a second threshold value that are used by a presentation unit 10 to present the index to determine whether the operation is available (hereinafter referred to as an "operation availability index") as ALU1 and ALU2, respectively, for support with the standing-up motion. Similarly, the battery information database 22 stores a first threshold value and a second threshold value used to present the operation availability index as ALD1 and ALD2, respectively, for the support with the sitting-down motion, and stores a first threshold value and a second threshold value used to present the operation availability index as ALW1 and ALW2, respectively, for walking motion support. That is, the first threshold value used to present the standing-up motion support operation availability index is ALU1, and the second threshold value used to present the standing-up motion support operation availability index is ALU2. The first threshold value used to present the sitting-down motion support operation availability index is ALD1, and the second threshold value used to present the sitting-down motion support operation availability index is ALD2. The first threshold value used to present the walking motion support operation availability index is ALW1, and the second threshold value used to present the walking motion support operation availability index is ALW2. Note that the first threshold value indicates the amount of energy charge that allows the operation to be performed a relatively large number of times (e.g., five times). In addition, the second threshold value indicates the amount of energy charge that allows the operation to be performed a relatively small number of times (e.g., once). If the battery level of the battery 21 is higher than or equal to the first threshold value, the battery 21 stores the amount of energy charge sufficient to perform the operation. In addition, if the battery level of the battery 21 is lower than or equal to the second threshold value, the battery 21 does not store the amount of energy charge sufficient to perform the operation. As can be seen from the above-described definitions, the first threshold value is greater than the second threshold value.

Note that the second threshold value may be set so as to be lower than the amount of energy charge required for the operation in accordance with the motion pattern for the support with the standing-up motion or the sitting-down motion provided once by the arm mechanism 4 and may be set so as to be higher than or equal to the amount of energy charge required for the operation in accordance with a motion pattern provided once to temporarily maintain the position of the arm mechanism 4. In this way, if the amount of energy charge sufficient for the arm mechanism 4 to perform an operation in accordance with the standing-up or sitting-down support motion pattern is not stored in the battery 21, an operation in accordance with a motion pattern for temporarily maintaining the position of the arm mechanism 4 can be performed.

Note that the first threshold value used while supporting with the standing-up motion is also simply referred to as a "first threshold value for the standing-up motion". This also applies while supporting with the sitting-down motion and the walking motion support. In addition, this applies to the second threshold value. That is, the first threshold value used while supporting with the sitting-down motion is simply referred to as a "first threshold value for the sitting-down motion". The first threshold value while supporting with the walking motion is simply referred to as a "first threshold value for the walking motion". The second threshold value while supporting with the standing-up motion is simply referred to as a "second threshold value for the standing-up motion". The second threshold value while supporting with the sitting-down motion is simply referred to as a "second threshold value for the sitting-down motion". The second threshold value while supporting with the walking motion is simply referred to as a "second threshold value for the walking motion".

In addition, as illustrated in FIG. 6B, the battery information database 22 stores the amount of energy charge required for the operation in accordance with the motion pattern for supporting with the standing-up motion as AU, the amount of energy charge required for the operation in accordance with the motion pattern for supporting with the sitting-down motion as AD, and the amount of energy charge required for the operation in accordance with the motion pattern for supporting with the walking motion as AW. The unit for the amount of energy charge is the ampere-hour (Ah). Note that each of the above-described values can be changed in accordance with the conditions of the battery or the weight or other conditions of the care receiver 7.

Control Unit

The control unit 12 controls the arm mechanism 4 and other units on the basis of an instruction input through the input IF 6. In addition, the control unit 12 controls braking forces of the front wheel brake 14c and the rear wheel brake 14d on the basis of the on/off instruction for the front wheel brakes 14c and 14d input through the input IF 6. Furthermore, the control unit 12 acquires the battery level from the battery 21 while the arm mechanism 4 is operating and compares the acquired battery level with the first threshold value for the standing-up motion acquired from the battery information database 22. Thereafter, if the control unit 12 detects that the battery level is lower than or equal to the first threshold value for the standing-up motion during the operation of the arm mechanism 4 and other units, the control unit 12 determines the operation availability index for the support with the standing-up motion. Similarly, if the control unit 12 detects that the battery level is lower than or equal to the first threshold value for the sitting-down motion during the operation of the arm mechanism 4 and other units, the control unit 12 determines the operation availability index for the support with the sitting-down motion. If the control unit 12 detects that the battery level is lower than or equal to the first threshold value of the walking motion during the operation of the arm mechanism 4 and other units, the control unit 12 determines the operation availability index for the support with the walking motion. Note that instead of comparing the battery level with the first threshold value while the arm mechanism 4 and other units are operating as described above, comparison of the battery level and the first threshold value may be made under the assumption that the arm mechanism 4 and other units are operating before the arm mechanism 4 and other units start operating. More specifically, the arm mechanism 4 may simulate the standing-up motion before the arm mechanism 4 and other units actually operate for supporting a user. During the simulated operation, the control unit 12 may detect whether the battery level is lower than or equal to the first threshold value for the standing-up motion.

In addition, the control unit 12 may determine the operation availability index for a series of motions of the care receiver 7 including the standing-up motion, the walking motion, and the sitting-down motion (hereinafter also referred to as "multiple motions"). An example of the series of motions is a series of motions in which the care receiver 7 sitting on a bed stands up, moves to a bathroom, and sits on a toilet. More specifically, the operation availability index represents the number of times or the duration the arm mechanism 4 can operate in accordance with the first motion pattern and second motion pattern by using the amount of energy charge in the battery 21 when the control unit 12 acquires the battery level.

That is, the control unit 12 determines the operation availability index on the basis of at least one of the amount of energy charge required for the standing-up motion and the amount of energy charge required for the sitting-down motion. That is, if the control unit 12 detects that the amount of energy charge in the battery 21 is lower than or equal to the first threshold value, the control unit 12 determines at least one of the operation availability index for the support with the standing-up motion by the arm mechanism 4, the operation availability index for the support with the sitting-down motion by the arm mechanism 4, and a multiple-motion support operation availability index indicating the availability of an operation for the support with multiple motions. The information regarding the multiple motions is stored in a multiple-motion database. An example of multiple motions is a round-trip between a bed and a toilet. For example, to determine the multiple-motion support operation availability index indicating the availability of the operation for supporting with multiple motions, the information regarding the multiple motions may include the number of the standing-up motions and the number of the sitting-down motions in advance (each of the standing-up motion and the sitting-down motion is one of the multiple motions). Alternatively, the information may include the number of the standing-up motions, the number of the sitting-down motions, and the duration of the walking motion in advance. An example of the information regarding the multiple motions is described in more detail below together with description of a process performed in step S104.

The control unit 12 includes the multiple-motion database. Alternatively, the control unit 12 may acquire the information regarding multiple motions from the multiple-motion database provided outside the control unit 12. The control unit 12 determines the number of times that support with standing-up motion can be provided on the basis of the amount of electricity consumed for one of the multiple motions. In addition, the control unit 12 determines the duration during which support with multiple motions can be provided on the basis of, for example, the amount of electricity consumed for one of the multiple motions or the average of the amounts of electricity required for each of the multiple motions.

Thereafter, the control unit 12 instructs the presentation unit 10 to present the determined operation availability index and information as to whether the battery level is lower than or equal to the first threshold value. Note that the following two types of information may be used as the operation availability index: information indicating that the arm mechanism 4 can perform an operation at least once in accordance with the motion pattern for supporting with the sitting-down motion and the motion pattern for supporting with the sitting-down motion by using the battery charge remaining when the control unit 12 acquires the battery level and information indicating that the arm mechanism 4 cannot perform the operation by using the battery charge.

In addition, as in the above description, the control unit 12 compares the acquired battery level with the second threshold value for each of the standing-up motion, the sitting-down motion, and the walking motion acquired from the battery information database 22. If the control unit 12 detects that the battery level is lower than or equal to the second threshold value for each of the above-mentioned motions, the control unit 12 determines the operation availability index for each of the motions. Thereafter, the control unit 12 instructs the presentation unit 10 to present the determined operation availability index and information as to whether the battery level is lower than or equal to the second threshold value.

Presentation Unit

Figure 7B:
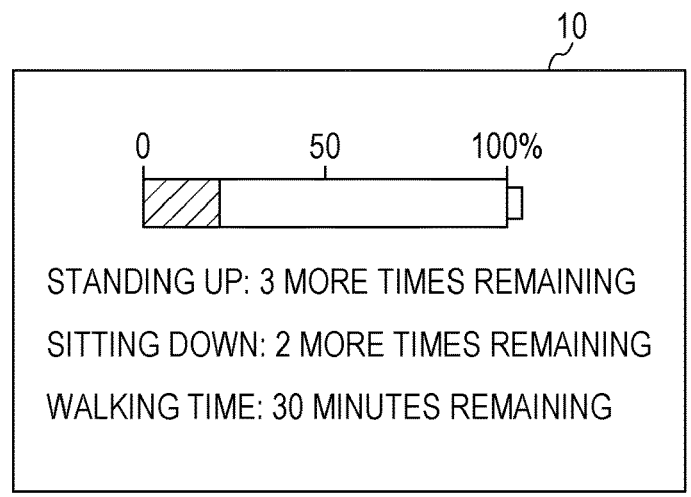
FIG. 7B illustrates a first example of the information presented by the presentation unit according to the exemplary embodiment.

The presentation unit 10 presents the operation availability index determined by the control unit 12. For example, the presentation unit 10 presents the operation availability index on a liquid crystal monitor provided in the upper portion of the input IF 6, such as the remote controller illustrated in FIG. 7A, in the form of an image. More specifically, as illustrated in FIG. 7B, the presentation unit 10 displays an image including the information regarding the number of times that support with a standing-up motion or a sitting-down motion can be provided or the duration for which support with a walking motion can be provided before the current battery charge is exhausted. Note that the duration or the number of times displayed by the image indicates that the battery charge remaining when the control unit 12 acquires the battery level will be depleted when each of the motions has been performed for the displayed duration or the number of times. For example, if, as illustrated in FIG. 7B, the message "Standing-up: 3 more times remaining, Sitting-down: 2 more times remaining, Walking: 30 minutes remaining" is displayed, the battery 21 of the robot system 1 has electric charge required for supporting with three standing-up motions, two sitting-down motions, and 30 minutes of walking. Note that the term "time when the control unit 12 acquires the battery level" means not only the exact time but any time within a predetermined time range after the exact time.

Figure 7C:
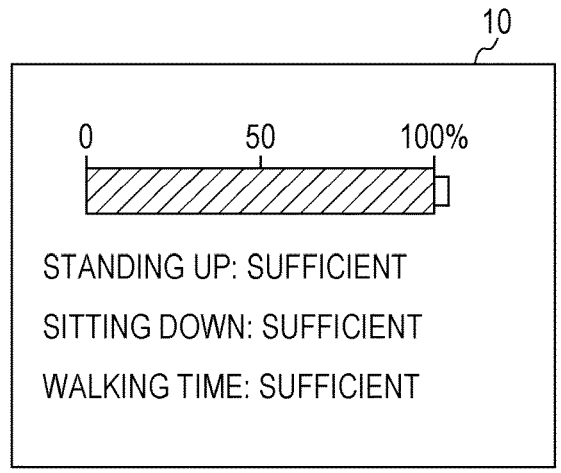
FIG. 7C illustrates a second example of the information presented by the presentation unit according to the exemplary embodiment.
Figure 7D:
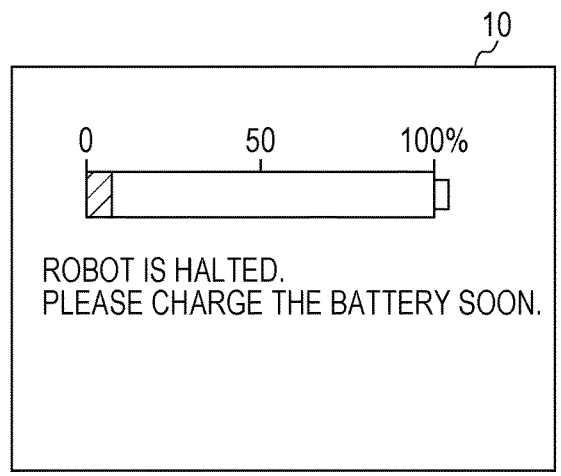
FIG. 7D illustrates a third example of the information presented by the presentation unit according to the exemplary embodiment.
Figure 7E:
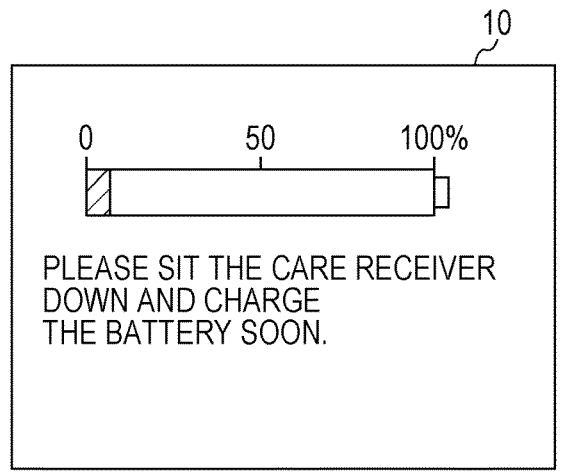
FIG. 7E illustrates a fourth example of the information presented by the presentation unit according to the exemplary embodiment.

Alternatively, as illustrated in FIG. 7B, the presentation unit 10 may display the image including a chart (a bar chart) so that the user can visually identify the battery level (with 100 percent corresponding to a full charge). In addition, as illustrated in FIG. 7C, if the battery level is above the threshold value, the presentation unit 10 may display the message "Sufficiently charged" without displaying the number of times the operation can be performed. In addition, the number of times or the duration the operation can be performed may be presented using a loudspeaker, vibration of a vibration motor embedded in the remote controller, or light emitted from a light source (e.g., a light-emitting diode) embedded in the remote controller. Furthermore, as illustrated in FIG. 7D or 7E, if the control unit 12 detects that the battery level is lower than or equal to the second threshold value, the presentation unit 10 may present a message prompting the user to charge the battery soon.

Note that if the arm mechanism 4 is started under hold-to-run control, the presentation unit 10 may present the operation availability index when the operation in accordance with a partial pattern corresponding to the input to the input IF 6 is completed.

In addition, the presentation unit 10 may present the above-described operation availability index when the front wheel brake 14c or the rear wheel brake 14d is turned on to prevent the walking mechanism 14 from moving or when the front wheel brake 14c or the rear wheel brake 14d is turned off to allow the walking mechanism 14 to move thereafter.

Timer

The timer 16 outputs, to the database input/output unit 9 and the control unit 12, an instruction instructing the database input/output unit 9 and the control unit 12 to perform the processes at predetermined intervals (e.g., 1-ms intervals).

Database Input/Output Unit

The database input/output unit 9 inputs and outputs data (e.g., information) between the motion information database 8 and the control unit 12.

Motion Information Database

The processes are performed by the database input/output unit 9 and the control unit 12 in response to an instruction from the timer 16 and, thus, the positional information regarding the arm mechanism 4 (e.g., the positional information obtained by converting the information regarding the angles of rotation received from the first encoder 43 and the second encoder 44 into the positional information regarding the arm mechanism 4) is generated at predetermined intervals (e.g., 1-ms intervals). The generated positional information is output to the motion information database 8 via the database input/output unit 9 together with information regarding the point in time so that the motion information is stored in the motion information database 8. Note that according to the present exemplary embodiment, the motion information is generated and is stored via the input IF 6 in advance.

FIG. 5 illustrates an example of the information in the motion information database 8.

(1) The "time" field includes information regarding the points in time while the arm mechanism 4 is operating. The unit of time is milliseconds (msec).

(2) The "position" field includes the positional information regarding the arm mechanism 4 obtained by converting the angle information detected by, for example, the first encoder 43 and the second encoder 44 of the arm mechanism 4. More specifically, as illustrated in FIG. 1A, one end of the arm mechanism 4 (e.g., the lower end of the first arm 4c illustrated in FIG. 1A) is defined as a point of origin O, the direction opposite to the travel direction of the robot system 1 is defined as a positive direction along an X-axis, and the upward direction is defined as a positive direction along a Z-axis. Then, the positional information is defined as a position using the two axes, that is, the coordinates relative to the point of origin O. The unit of position is meters (m).

Figure 8A:
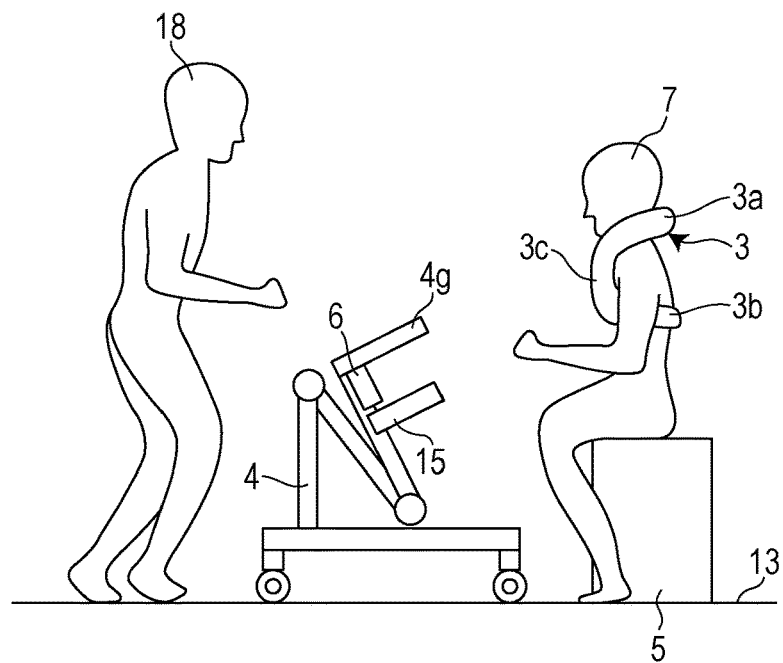
FIG. 8A is a first illustration of the operation performed by the robot system according to the exemplary embodiment from the time an arm mechanism stays in the folded position to the time the arm mechanism is attached to a care receiver.
Figure 8B:
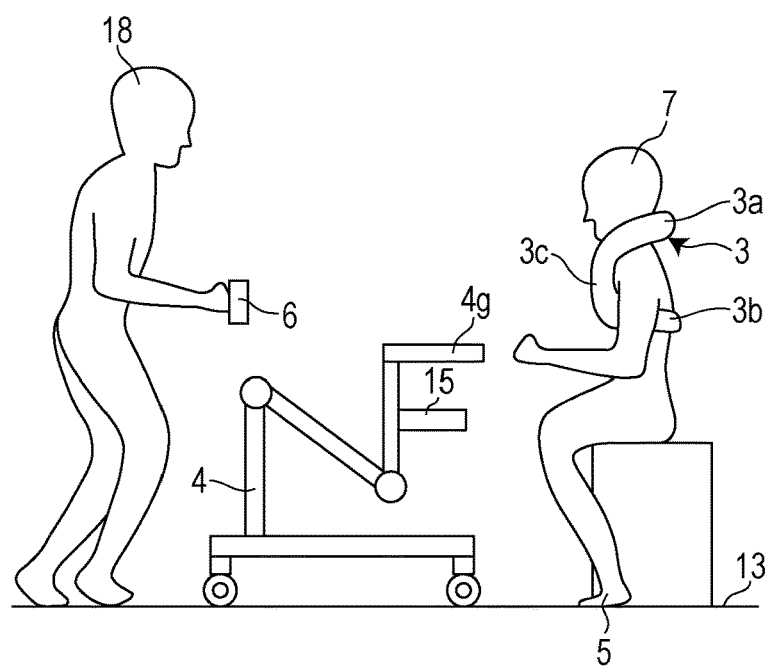
FIG. 8B is a second illustration of the operation performed by the robot system according to the exemplary embodiment from the time the arm mechanism stays in the folded position to the time the arm mechanism is attached to a care receiver.
Figure 8C:
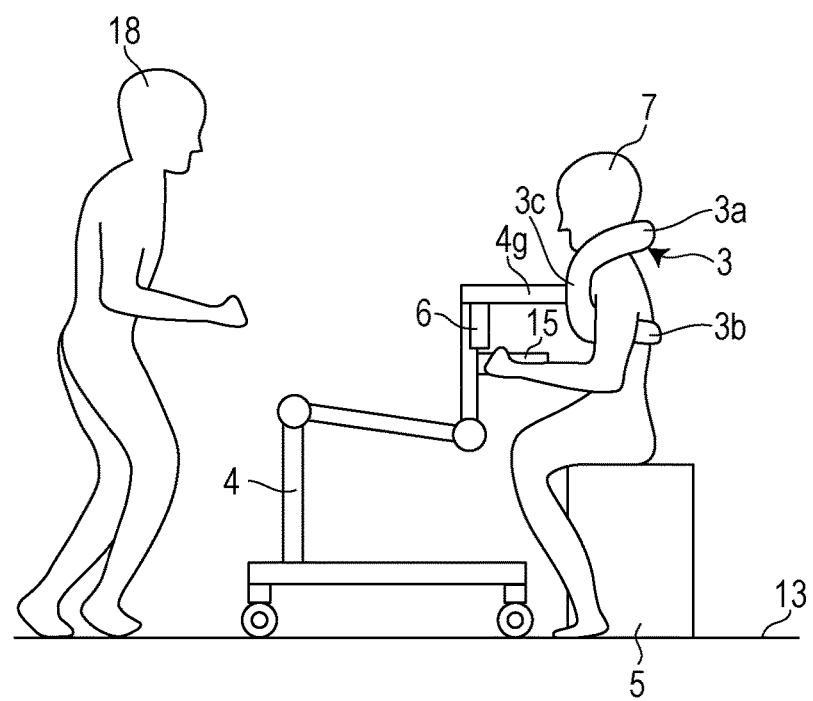
FIG. 8C is a third illustration of the operation performed by the robot system according to the exemplary embodiment from the time the arm mechanism stays in a folded position to the time the arm mechanism is attached to a care receiver.

(3) The "initial position flag" field includes a flag indicating whether the arm mechanism 4 is located at the initial position when the arm mechanism 4 moves from a position at which the arm mechanism 4 is folded for storage (refer to FIG. 8A) to the initial position (refer to FIG. 8B). The initial position flag is "0" or "1". The value "0" indicates that the current position of the arm mechanism 4 is the initial position. In contrast, the value "1" indicates that the current position of the arm mechanism 4 is not the initial position.

(4) The "progress information" field includes information regarding the progress of the motion when the robot system 1 operates. The information is stored by the control unit 12. The value "1" is set in the "progress information" field corresponding to a time corresponding to the current position of the robot system 1 (i.e., the time when the control operation is performed) by the control unit 12. In addition, the value "0" is set in each of all the "progress information" fields corresponding to the other times by the control unit 12. If movement to the initial position is not completed, the value "0" is set to the "progress information" field of each of all the rows (each of the rows corresponds to one of the "time" fields) by the control unit 12. Immediately after the movement to the initial position is completed, the value "1" is set in the "progress information" field of the row having a "initial position" field containing the value "1" by the control unit 12.

Operation

The operation performed by the robot system 1 under the control of the control unit 12 is described below. The operation sequence of the arm mechanism 4 of the robot system 1 and the motions of the caregiver 18 and the care receiver 7 in accordance with the operation of the arm mechanism 4 are illustrated in FIGS. 3A to 3C, FIGS. 4A to 4C, and FIGS. 8A to 8C. The operation performed by the robot system 1 is illustrated in FIGS. 9 to 13.

Figure 9:
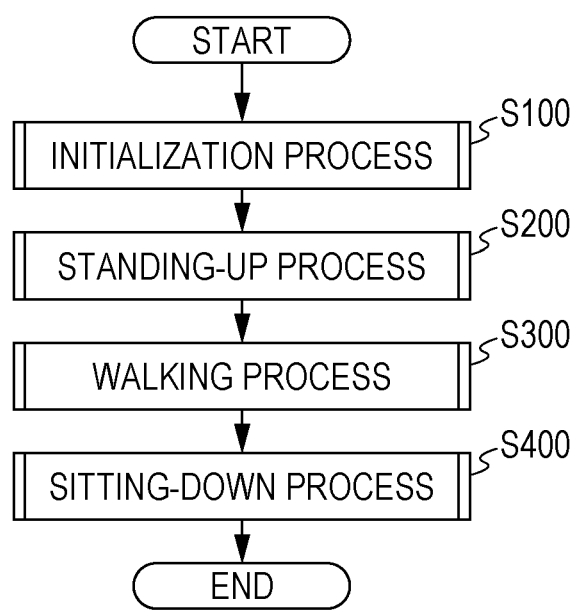
FIG. 9 is a flow diagram illustrating a series of processes performed by the robot system according to the exemplary embodiment.

FIG. 9 is a flow diagram illustrating a series of processes performed by the robot system 1 according to the present exemplary embodiment.

FIG. 9 illustrates an operation flow of a standing up process, a walking process, and a sitting down process performed by the robot system 1 from the time the care receiver 7 sits on a bed to the time the care receiver 7 sits on a toilet.

The robot system 1 performs an initialization process, such as a power-on process, first (step S100). Thereafter, the robot system 1 performs the standing up process to support the care receiver 7 with the standing-up motion from the bed (step S200) and the walking process to support the care receiver 7 with the walking motion from the bed to a toilet (step S300). Finally, the robot system 1 performs the sitting down process to support the care receiver 7 with the sitting-down motion onto a toilet seat (step S400). Each of the steps is described in detail below.

Initialization Process

Figure 10:
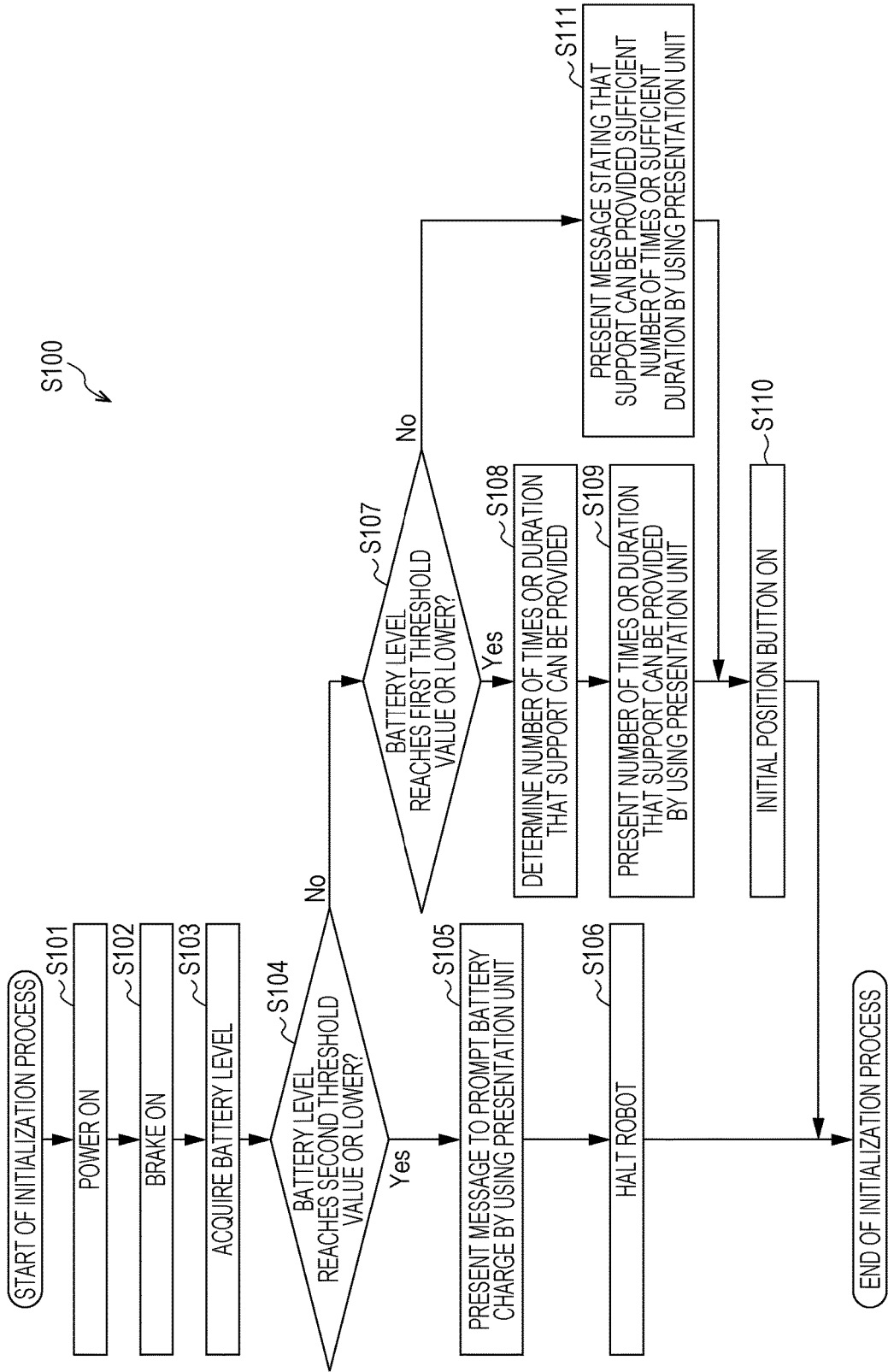
FIG. 10 is a flow diagram illustrating an initialization process performed by the robot system according to the exemplary embodiment.

FIG. 10 is a flow diagram illustrating the initialization process performed by the robot system 1 according to the present exemplary embodiment. The flow diagram illustrated in FIG. 10 describes the initialization process illustrated in FIG. 9 (step S100) in detail.

As illustrated in FIG. 8A, the care receiver 7 sits on the seat unit 5, such as a bed, placed on the floor 13 first. The caregiver 18 moves the robot system 1 with the arm mechanism 4 folded for storage in front of the care receiver 7.

In step S101, the caregiver 18 or the care receiver 7 powers on the robot system 1 by using the power button 6a of the input IF 6 of the robot 20.

In step S102, the caregiver 18 or the care receiver 7 turns on the brake by using the brake button 6d of the input IF 6 of the robot 20.

In step S103, the control unit 12 acquires the battery level from the battery 21.

In step S104, the control unit 12 determines whether the battery level acquired in step S103 is lower than or equal to the second threshold value for any one of the standing-up motion, the sitting-down motion, and the walking motion. If the control unit 12 detects that the battery level is lower than or equal to the second threshold value for any one of the above-described motions, the processing proceeds to step S105. However, if the control unit 12 does not detect that the battery level is lower than or equal to the second threshold value for any one of the above-described motions, that is, detects that the battery level is higher than the second threshold value for any one of the motions, the processing proceeds to step S106. Note that the battery information database 22 may store a first threshold value and a second threshold value used to present a multiple-motion support operation availability index. The control unit 12 includes the battery information database 22. Alternatively, the control unit 12 may acquire the first threshold value and the second threshold value from the battery information database 22 disposed outside the control unit 12. The control unit 12 may detect whether the battery level acquired in step S103 is lower than or equal to the second threshold value for multiple motions.

An example of the multiple motions includes two standing-up motions, two sitting-down motions, and a walking motion over a predetermined distance. Another example of the multiple motions includes one standing-up motion, one sitting-down motion, and a walking motion over the predetermined distance. For example, to support with a movement from a bet to a toilet, a movement to use the toilet, and a movement from the toilet to the bed, the multiple motions includes two standing-up motions, two sitting-down motions, and the walking motion over a predetermined distance. As a particular example, the multiple motions include a standing-up motion from a bed, a walking motion from the bed to a toilet, a sitting-down motion on a toilet, a standing-up motion from the toilet, a walking motion from the toilet to the bed, and a sitting-down motion on the bed (i.e., two standing-up motions, two sitting-down motions, and the walking motion over a predetermined distance). At that time, an example of the amount of energy charge consumed for the multiple motions is the sum of the amount of energy charge for two standing-up motions, the amount of energy charge for two sitting-down motions, and the amount of energy charge for a walking motion over the predetermined distance.

To support with a movement to use a toilet (i.e., a walking motion to the toilet, a sitting-down motion on the toilet, and a standing-up motion from the toilet), the multiple motions include one standing-up motion and one sitting-down motion, and the walking motion over a predetermined distance. As a particular example, the multiple motions include a walking motion to a toilet, a sitting-down motion on a toilet, and a standing-up motion from the toilet (one standing-up motion and one sitting-down motion, and the walking motion over the predetermined distance). At that time, an example of the amount of energy charge consumed for the multiple motions is the sum of the amount of energy charge for one standing-up motion, the amount of energy charge for one sitting-down motion, and the amount of energy charge for a walking motion over the predetermined distance.

To support a standing care receiver with a movement to use a toilet and a movement from the toilet to a bed, the multiple motions include one standing-up motion, two sitting-down motions, and the walking motion over a predetermined distance. As a particular example, the multiple motions include a walking motion to a toilet, a sitting-down motion on the toilet, a standing-up motion from the toilet, a walking motion from the toilet to the bed, and a sitting-down motion on the bed (one standing-up motion, two sitting-down motions, and a walking motion over a predetermined distance). At that time, an example of the amount of energy charge consumed for the multiple motions is the sum of the amount of energy charge for one standing-up motion, the amount of energy charge for two sitting-down motions, and the amount of energy charge for a walking motion over the predetermined distance.

Note that an example of the predetermined distance is a value acquired by the control unit 12 from the user through an input device or a predetermined value (e.g., 10 m). Examples of the input device include a touch panel, a mouse, and a keyboard.

In step S105, as illustrated in FIG. 7D, the presentation unit 10 presents a message to prompt battery charge. Note that in this example, as illustrated in FIG. 7D, if the battery level is lower than or equal to the second threshold value for any one of the standing-up motion, the sitting-down motion, and the walking motion, the message is presented for all the motions. However, the message may be presented for each of the motions.

In step S106, the control unit 12 halts the robot 20. Note that the "halt" does not mean that the power is completely turned off. Although the input IF 6 does not allow an operation performed on the buttons for operating the robot 20, such as the "Up" button 6b, the "Down" button 6c, and the return-to-initial-position button 6e, turning off the brake is allowed. That is, when the robot 20 is halted, the robot 20 is maintained at the position at which the robot 20 was initialized (the initial position). In this manner, the arms can be prevented from being folded (refer to FIG. 8A) with the care receiver 7 being connected to the robot system 1 when the power is turned off. Note that the control unit 12 enables or disables the buttons. After the process in step S106 is completed, the initialization process is completed.

In step S107, the control unit 12 detects whether the battery level acquired in step S103 is lower than or equal to the first threshold value for any one of the standing-up motion, the sitting-down motion, and the walking motion. If it is detected that the battery level is lower than or equal to the first threshold value for any one of the motions, the processing proceeds to step S108. However, if it is not detected that the battery level is lower than or equal to the first threshold value for any one of the motions, that is, if it is detected that the battery level is higher than any one of the first threshold values, the processing proceeds to step S111. Note that the control unit 12 may use the first threshold value for multiple motions. As described above, an example of the multiple motions includes a standing-up motion, a sitting-down motion, and a walking motion. If the multiple motions do not include the walking motion for the support, the example of the multiple motions includes only the standing-up motion and the sitting-down motion.

A particular example of the first threshold value for multiple motions is the sum of the amount of energy charge required for two standing-up motions and the amount of energy charge required for two sitting-down motions. A particular example of the first threshold value for the multiple motions is the sum of the amount of energy charge required for two standing-up motions, the amount of energy charge required for two sitting-down motions, and the amount of energy charge required for the walking motion over a predetermined distance. A particular example of the first threshold value for the multiple motions is the sum of the amount of energy charge required for one standing-up motion and the amount of energy charge required for one sitting-down motion. A particular example of the first threshold value for the multiple motions is the sum of the amount of energy charge required for one standing-up motion, the amount of energy charge required for one sitting-down motion, and the amount of energy charge required for the walking motion over a predetermined distance.

As described above, the first threshold value is greater than the second threshold value. Note that an example of the predetermined distance is a value acquired from the user by the control unit 12 through an input device or a predetermined value (e.g., 10 m). Examples of the input device include a touch panel, a mouse, and a keyboard.

In step S108, the control unit 12 determines the operation availability index used to support the care receiver 7 with the motion on the basis of the battery level acquired in step S103. As a particular example of determination of the operation availability index by the control unit 12, the control unit 12 calculates the operation availability index on the basis of the battery level acquired in step S103, the amount of energy charge required for the motion in accordance with the motion pattern for supporting with the standing-up motion, and the amount of energy charge required for the motion in accordance with the motion pattern for supporting with the sitting-down motion. At least one of the following indices is calculated as the operation availability index: a first index indicating the availability of the motion in accordance with the motion pattern for supporting with the standing-up motion, a second index indicating the availability of the motion in accordance with the motion pattern for supporting with the sitting-down motion, and a multiple-motion support operation availability index indicating the availability of an operation in accordance with a multiple-motion pattern including the motion pattern for supporting with the standing-up motion and the motion pattern for supporting with the sitting-down motion. Note that a particular example of the operation availability index is the number of times or the duration that support can be provided.

Figure 7F:
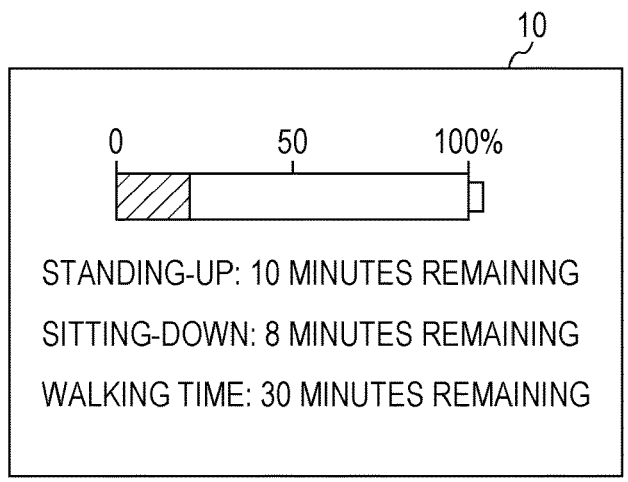
FIG. 7F illustrates a fifth example of the information presented by the presentation unit according to the exemplary embodiment.
Figure 7G:
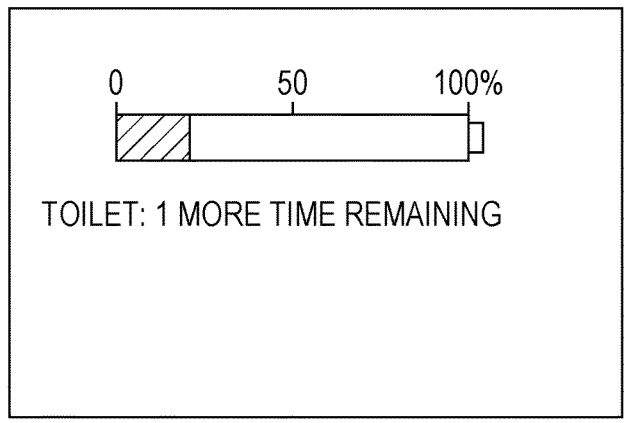
FIG. 7G illustrates a sixth example of the information presented by the presentation unit according to the exemplary embodiment.
Figure 7H:
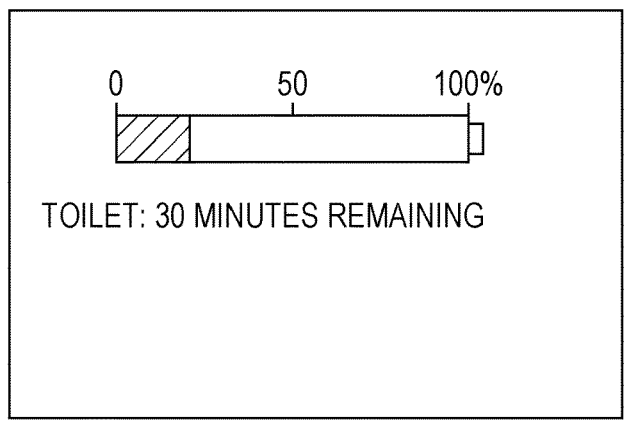
FIG. 7H illustrates a seventh example of the information presented by the presentation unit according to the exemplary embodiment.

In step S109, as illustrated in FIG. 7B, the presentation unit 10 presents the number of times or the duration that support with the standing-up motion or the sitting-down motion can be provided determined in step S108. Note that as illustrated in FIG. 7F, instead of presenting the number of times that support with the standing-up motion or the sitting-down motion can be provided, the presentation unit 10 may display the duration that support with the standing-up motion or the sitting-down motion can be provided. As illustrated in FIG. 7G, the presentation unit 10 may present the number of times that support with the multiple motions can be provided. An example of the multiple motions include a pair consisting of a standing-up motion and a sitting-down motion or a set of a standing-up motion, a sitting-down motion, and a walking motion. Alternatively, as illustrated in FIG. 7H, the presentation unit 10 may display the duration during which support with the multiple motions can be provided.

In step S110, after the presentation given by the presentation unit 10 is completed, the return-to-initial-position button 6e of the input IF 6 of the robot 20 is operated. Thus, the arm mechanism 4 is operated under the control of the control unit 12 so that the robot system 1 is moved to the initial position. Thereafter, the initialization process is completed.

In step S111, as illustrated in FIG. 7C, the presentation unit 10 presents a message stating that the battery level of the battery 21 is sufficient and, thus, the number of times or the duration that support with the standing-up or sitting-down motion can be provided need not be taken into account. After the process performed in step S111 is completed, the processing proceeds to step S110.

Through the processes in the above-described steps, the initialization process is completed.

Standing Up Process

Figure 11:
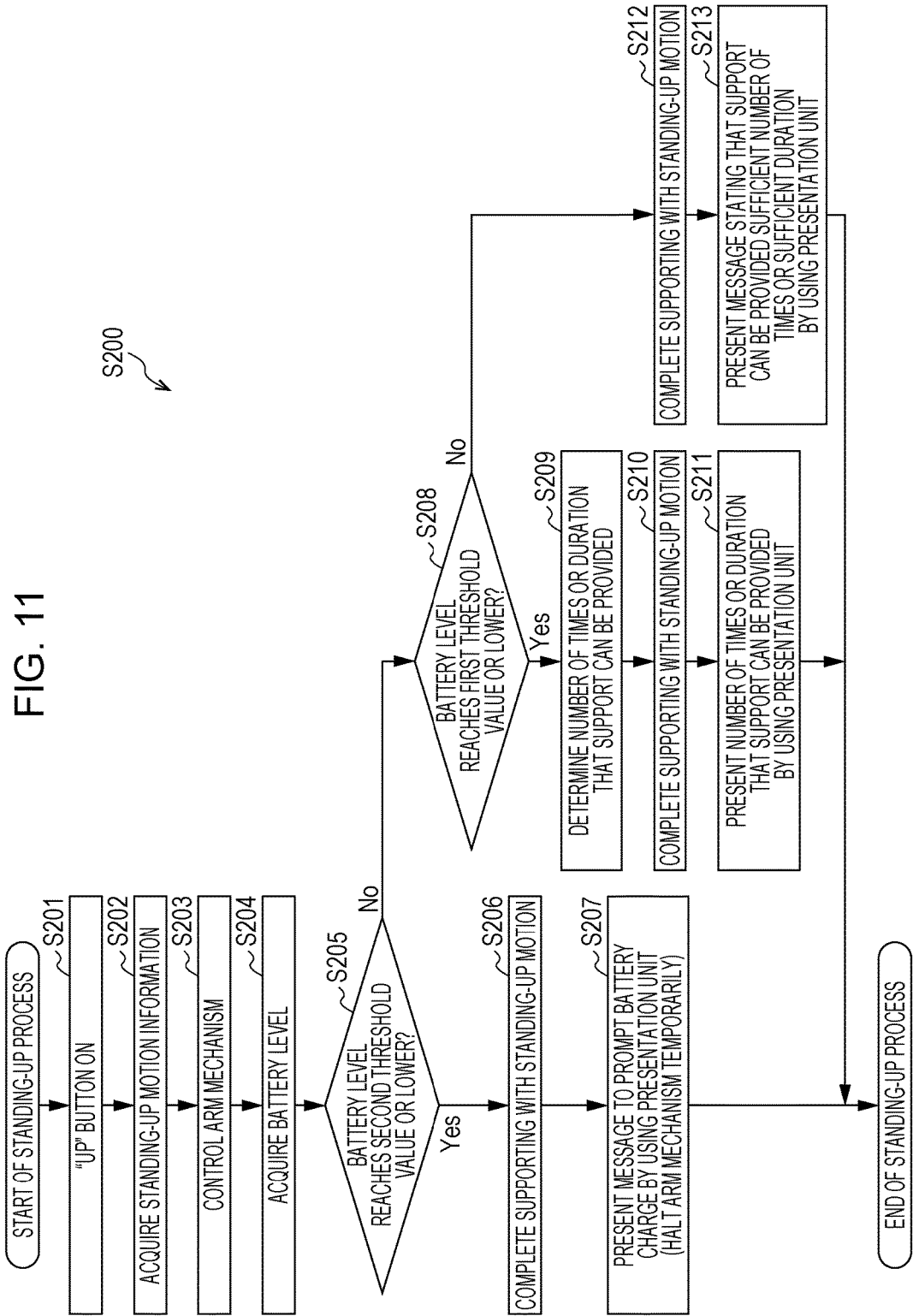
FIG. 11 is a flow diagram illustrating a standing up process performed by the robot system according to the exemplary embodiment.

FIG. 11 is a flow diagram illustrating the standing up process performed by the robot system 1 according to the present exemplary embodiment. The flow diagram illustrated in FIG. 11 describes the standing up process illustrated in FIG. 9 (step S200) in detail.

In step S201, if the caregiver 18 or the care receiver 7 presses the "Up" button 6b of the input IF 6, the robot system 1 starts supporting the care receiver 7 with the standing-up motion. In this example, if the "Up" button 6b is pressed and, thereafter, is released, the robot system 1 starts operating to support the care receiver 7 with the standing-up motion so that the care receiver 7 moves from a sitting posture to a standing posture.

In step S202, the control unit 12 acquires the motion information in the motion information database 8 via the database input/output unit 9.

In step S203, the control unit 12 controls the arm mechanism 4 so that the arm mechanism 4 is located at the position indicated by the motion information acquired in step S202. More specifically, the control unit 12 causes the arm mechanism 4 to sequentially operate as illustrated in FIG. 3A, FIG. 3B, and FIG. 3C.

In step S204, the control unit 12 acquires the battery level from the battery 21 during the operation performed by the arm mechanism 4.

In step S205, the control unit 12 detects whether the battery level acquired in step S204 during the operation of the arm mechanism 4 is lower than or equal to the second threshold value for any one of the standing-up motion, the sitting-down motion, and the walking motion. If the control unit 12 detects that the battery level is lower than or equal to the second threshold value for any one of the motions, the processing proceeds to step S206. However, if the control unit 12 does not detect that the battery level is lower than or equal to the second threshold value for any one of the motions, that is, if the battery level is higher than the second threshold value for any one of the motions, the processing proceeds to step S208.

In step S206, support with the standing-up motion by the robot 20 is completed.

In step S207, as illustrated in FIG. 7D, the presentation unit 10 presents a message to prompt battery charge. After the process performed in step S207 is completed, the standing up process is completed.

After the standing up process is completed, the robot system 1 may automatically halt, for example. If the care receiver 7 is sitting, the caregiver 18 may move the care receiver 7 away from the robot 20 to ensure the safety of the care receiver 7. In this way, the care receiver 7 is assisted on the basis of the decision made by the caregiver 18. Note that if the robot system 1 automatically halts, the power is not turned off. The robot system 1 may halt at the position and deny an operation other than brake-on and brake-off. In this manner, the arms can be prevented from being folded (refer to FIG. 8A) with the care receiver 7 being connected to the robot system 1.

In addition, instead of automatically halting, if the care receiver 7 is in a standing posture, the robot system 1 can set the care receiver 7 in a sitting posture by generating a motion from the standing-up motion in the time-reverse direction (i.e., reverse playback) or supporting the care receiver 7 with the sitting-down motion. In this manner, by changing back the state of the care receiver 7 to the state of the care receiver 7 before the support with the standing-up motion by the robot 20, the safety of the care receiver 7 can be ensured. Note that if the state of the care receiver 7 is changed back to the state of the care receiver 7 before the support with the standing-up motion, the care receiver 7 is in a sitting posture. If, at that time, the seat unit 5 is not present (e.g., the seat unit 5 is moved away), the care receiver 7 is in a sitting posture in the air and, therefore, the safety of the care receiver 7 is not ensured. Accordingly, it is effective to change back the state of the care receiver 7 to the state of the care receiver 7 before the support with the standing-up motion in the above-described manner only when the seat unit 5 is present.

In step S208, the control unit 12 detects whether the battery level acquired in step S204 during the operation of the arm mechanism 4 is lower than or equal to the first threshold value for any one of the standing-up motion, the sitting-down motion, and the walking motion. If the control unit 12 detects that the battery level is lower than or equal to the first threshold value for any one of the motions, the processing proceeds to step S209. However, if the control unit 12 does not detect that the battery level is lower than or equal to the first threshold value for any one of the motions, that is, if the battery level is higher than the first threshold value for any one of the motions, the processing proceeds to step S212.

In step S209, the control unit 12 determines the operation availability index for supporting the care receiver 7 with the motion on the basis of the battery level acquired in step S203. Note that since a particular example of the amount of energy charge used for the determination and a particular example of the operation availability index are the same as those in step S108, detailed description of the particular examples are not repeated.

In step S210, support with the standing-up motion by the robot 20 is completed.

In step S211, as illustrated in FIG. 7B, the presentation unit 10 presents the number of times that support with the standing-up motion or the sitting-down motion can be provided. After the process performed in step S211 is completed, the standing-up process is completed.

In step S212, support with the standing-up motion by the robot 20 is completed.

In step S213, as illustrated in FIG. 7C, the presentation unit 10 presents a message stating that the battery level of the battery 21 is sufficient and, thus, the number of times or the duration support with the standing-up or sitting-down motion can be provided need not be taken into account. After the process performed in step S213 is completed, the standing-up process is completed.

Through the processes in the above-described steps, the standing-up process is completed.

Note that, instead of presenting the number of times that support with the standing-up motion or the sitting-down motion can be provided in step S211 illustrated in FIG. 7B, the presentation unit 10 may present the duration that support with the standing-up motion or the sitting-down motion can be provided as illustrated in FIG. 7F. In this example, if the "Up" button 6b is pressed and, thereafter, is released, the robot system 1 operates so that the care receiver 7 moves from the sitting posture to the standing posture. However, the robot system 1 may operate only when the "Up" button 6b is being pressed. If the "Up" button 6b is released, the robot system 1 may halt. In such a case, the "Up" button 6b can be turned on or off a plurality of times before the standing-up motion is completed. Consequently, the control unit 12 cannot detect the point in time at which the standing-up motion is completed. Accordingly, instead of the number of times that support can be provided, the presentation unit 10 may present the duration that support can be provided when the "Up" button 6b is turned off (refer to FIG. 7F).

Through the processes in the above-described steps, the standing-up process is completed.

The process to acquire the battery level and compare the acquired battery level with the first threshold value or a second threshold value (steps S204, S205, and S208) may be performed a plurality of times during the operation of the arm mechanism 4. In such a case, the process to present information (steps S207, S211, and S213) may be performed by the presentation unit 10 immediately after completion of the above-described comparison is completed, instead of after completion of the support with the standing-up motion.

Note that if, at that time, it is detected that the battery level is lower than or equal to the second threshold value, the operation currently performed may halt and start operating the arm mechanism 4 in accordance with a motion pattern that differs from the currently used motion pattern. More specifically, examples of a motion pattern that differs from the currently used motion pattern may include a motion pattern that temporarily maintain the position of the arm mechanism 4, that is, a motion pattern that temporarily halts the arm mechanism 4.

In addition, note that if the multiple motions are formed from a series of motions performed by the care receiver 7 (that is, a first standing-up motion performed by the care receiver 7, a first sitting-down motion performed by the care receiver 7 after the first standing-up motion performed by the care receiver 7 and before a second standing-up motion performed by the care receiver 7, the second standing-up motion performed by the care receiver 7 after the first sitting-down motion performed by the care receiver 7 and before a second sitting-down motion performed by the care receiver 7, and the second sitting-down motion performed by the care receiver 7 after the second standing-up motion performed by the care receiver 7), the second threshold value for the multiple motions (that is, the second threshold value used to present the multiple-motion support operation availability index) may be equal to an amount of energy charge that is twice the sum of the amounts of energy charge required for a motion in accordance with a motion pattern for one support with the standing-up motion and a motion in accordance with a motion pattern for one support with the sitting-down motion. The battery information database 22 may store the second threshold value for the multiple motions. As used herein, the term "standing-up motion" refers to an entire motion which start in a sitting posture and finish in a standing posture, and the term "sitting-down motion" refers to an entire motion which start in a standing posture and finish in a sitting posture.

If the flow diagram in FIG. 10 illustrates the initialization process of the multiple motions and the flow diagram in FIG. 11 illustrates the standing-up process for the first standing-up motion of the multiple motions, the control unit 12 may detect whether the battery level is lower than or equal to the second threshold value for the multiple motions in step S205. If the control unit 12 detects that the battery level is lower than or equal to the second threshold value, the control unit 12 may cause the presentation unit 10 to display a message stating that power needs to be supplied to the robot, that is, to present a message to prompt battery charge.

Walking Process

Figure 12:
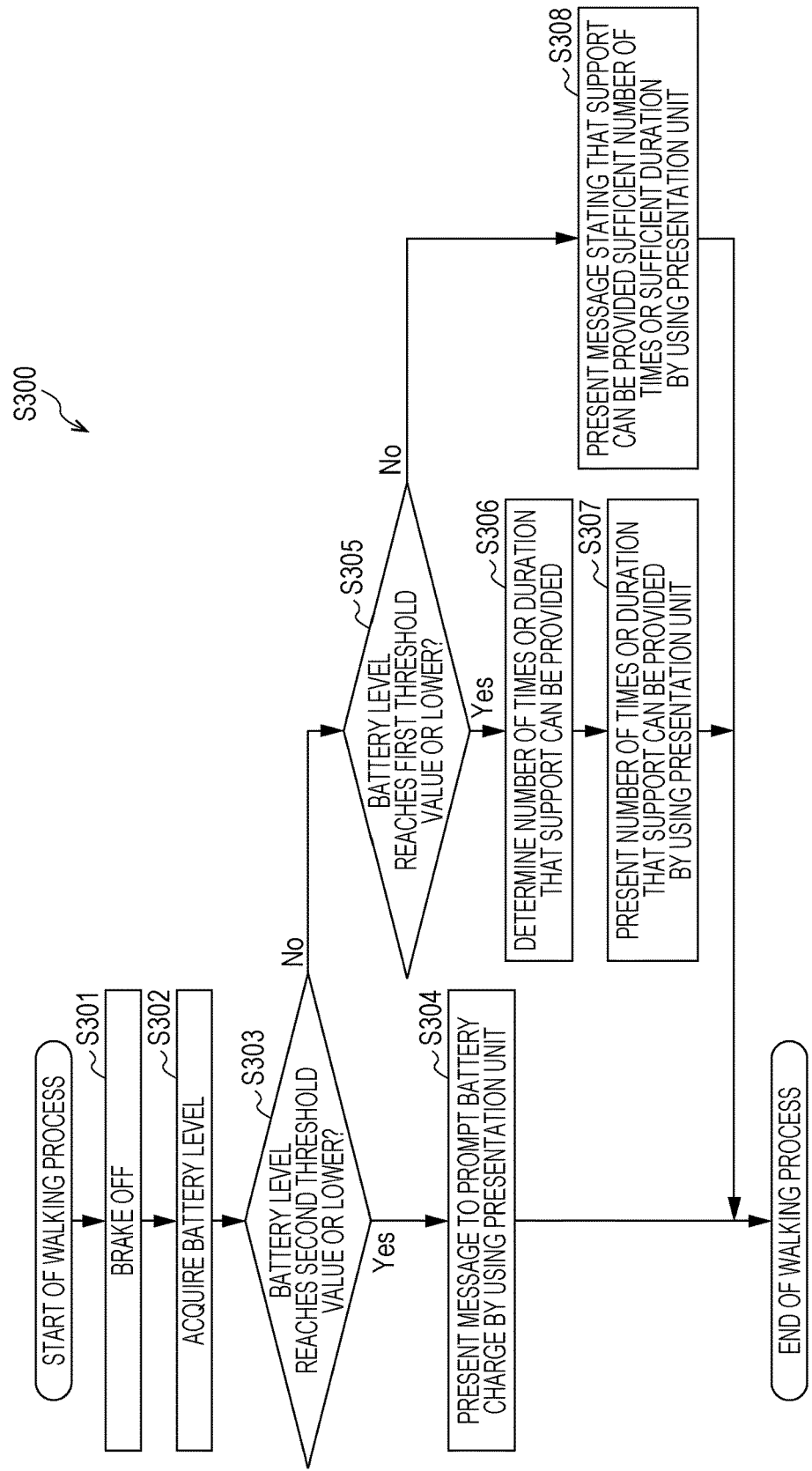
FIG. 12 is a flow diagram illustrating a walking process performed by the robot system according to the exemplary embodiment.

FIG. 12 is a flow diagram illustrating the walking process performed by the robot system 1 according to the present exemplary embodiment. The flow diagram illustrated in FIG. 12 describes the walking process illustrated in FIG. 9 (step S300) in detail.

In step S301, the input IF 6 receives the operation performed on the brake button 6d to turn off the brake. Thereafter, the care receiver 7 applies a force to the robot 20 in the frontward direction (the left direction in FIG. 3C) so that the wheels of the walking mechanism 14 rotate. Thus, the robot 20 serves as a wheeled walker and provides support to the care receiver 7 while walking.

In step S302, the control unit 12 acquires the battery level from the battery 21.

In step S303, the control unit 12 detects whether the battery level acquired in step S302 is lower than or equal to the second threshold value for any one of the standing-up motion, the sitting-down motion, and the walking motion. If the control unit 12 detects that the acquired battery level is lower than or equal to the second threshold value for any one of the above-described motions, the processing proceeds to step S304. However, if the control unit 12 does not detect that the acquired battery level is lower than or equal to the second threshold value for any one of the above-described motions, that is, the battery level is higher than the second threshold value for any one of the motions, the processing proceeds to step S305.

In step S304, as illustrated in FIG. 7D, the presentation unit 10 presents a message to prompt battery charge. After the process in step S304 is completed, the walking process is completed. Note that since, in this case, the care receiver 7 is in a standing posture, the care receiver 7 may be prompted to sit down as illustrated in FIG. 7E. After the care receiver 7 performs the sitting-down motion at a safe place, the care receiver 7 may be disconnected from the robot system 1.

In step S305, the control unit 12 detects whether the battery level acquired in step S302 is lower than or equal to the first threshold value for any one of the standing-up motion, the sitting-down motion, and the walking motion. If the control unit 12 detects that the acquired battery level is lower than or equal to the first threshold value for any one of the above-described motions, the processing proceeds to step S306. However, if the control unit 12 does not detect that the acquired battery level is lower than or equal to the first threshold value for any one of the above-described motions, that is, the battery level is higher than the first threshold value for any one of the motions, the processing proceeds to step S307.

In step S306, the control unit 12 determines the operation availability index for supporting the care receiver 7 with the motion on the basis of the battery level acquired in step S302. Note that since a particular example of the amount of energy charge used for the determination and a particular example of the operation availability index are the same as those in step S108, detailed description of the particular examples are not repeated.

In step S307, as illustrated in FIG. 7B or 7F, the presentation unit 10 presents the number of times or the duration that support with the standing-up motion or the sitting-down motion can be provided. After the process in step S307 is completed, the walking process is completed.

In step S308, as illustrated in FIG. 7C, the presentation unit 10 presents a message stating that the battery level of the battery 21 is sufficient and, thus, the number of times or the duration that support with the standing-up or sitting-down motion can be provided need not be taken into account. After the process performed in step S308 is completed, the walking process is completed.

In this manner, the walking process is completed.

Sitting Down Process

Figure 13:
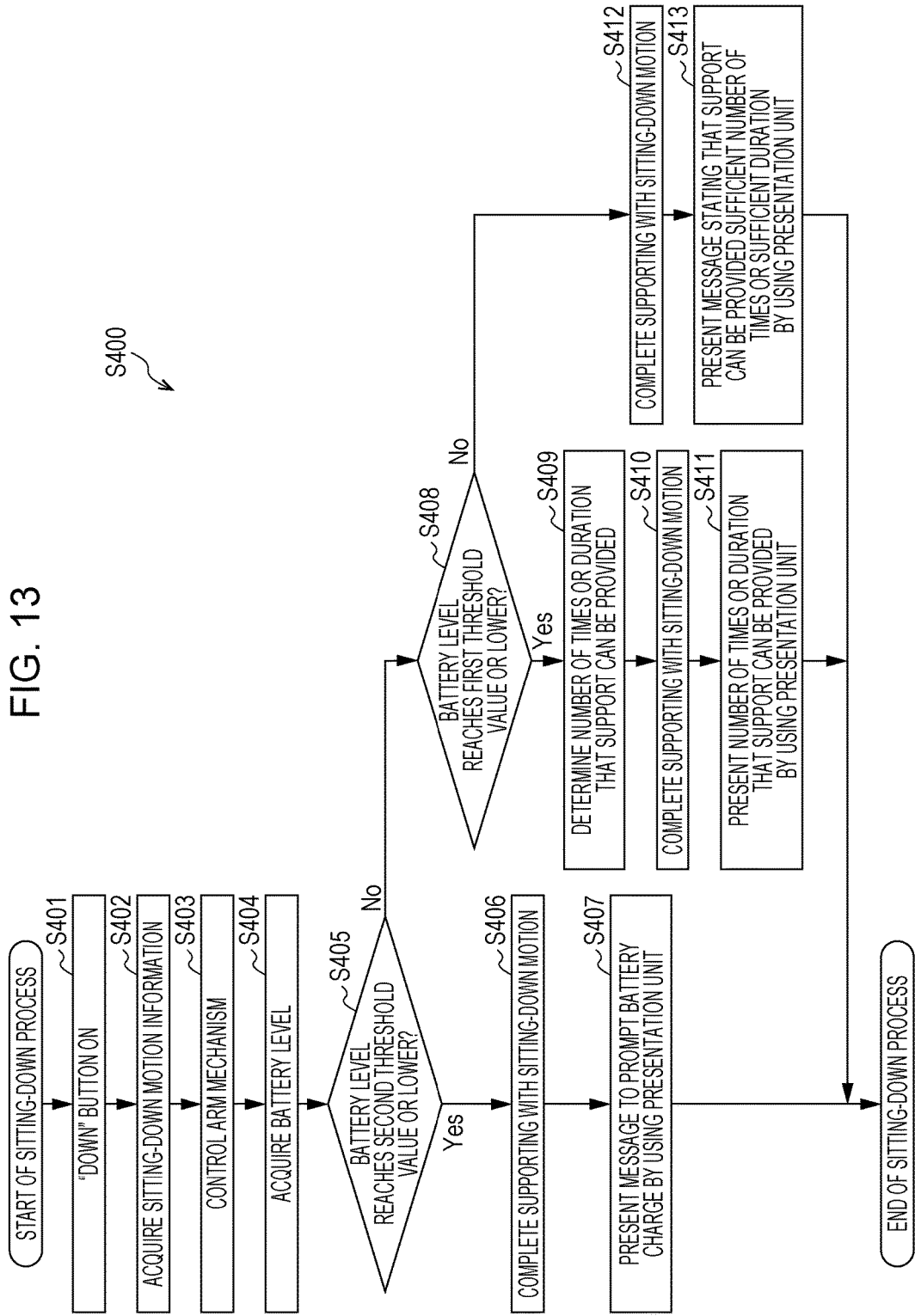
FIG. 13 is a flow diagram illustrating a sitting down process performed by the robot system according to the exemplary embodiment.

FIG. 13 is a flow diagram illustrating the sitting down process performed by the robot system 1 according to the present exemplary embodiment. The flow diagram illustrated in FIG. 13 describes the sitting down process illustrated in FIG. 9 (step S400) in detail.

In step S401, upon receiving the pressing operation performed on the "Down" button 6c of the input IF 6 by the caregiver 18 or the care receiver 7, the robot system 1 starts supporting the care receiver 7 with the sitting-down motion. In this example, if the "Down" button 6c is pressed and, thereafter, is released, the robot system 1 starts operating to support the care receiver 7 with the sitting-down motion so that the care receiver 7 moves from a standing posture to a sitting posture.

In step S402, the control unit 12 acquires the motion information in the motion information database 8 via the database input/output unit 9.

In step S403, the control unit 12 controls the arm mechanism 4 so that the arm mechanism 4 is located at the position indicated by the motion information acquired in step S402. More specifically, the control unit 12 causes the arm mechanism 4 to sequentially operate as illustrated in FIG. 4A, FIG. 4B, and FIG. 4C.

In step S404, the control unit 12 acquires the battery level from the battery 21 during the operation performed by the arm mechanism 4.

In step S405, the control unit 12 detects whether the battery level acquired in step S404 during the operation performed by the arm mechanism 4 is lower than or equal to the second threshold value for any one of the standing-up motion, the sitting-down motion, and the walking motion. If the control unit 12 detects that the acquired battery level is lower than or equal to the second threshold value for any one of the above-described motions, the processing proceeds to step S406. However, if the control unit 12 does not detect that the acquired battery level is lower than or equal to the second threshold value for any one of the above-described motions, that is, the battery level is higher than the second threshold value for any one of the motions, the processing proceeds to step S408.

In step S406, the support with the sitting-down motion by the robot 20 is completed.

In step S407, as illustrated in FIG. 7D, the presentation unit 10 presents a message to prompt battery charge. After the process in step S407 is completed, the sitting down process is completed.

After the standing up process is completed, the robot system 1 may automatically halt, for example. If the care receiver 7 is sitting, the caregiver 18 may move the care receiver 7 away from the robot 20 to ensure the safety of the care receiver 7 on the basis of the decision made by the caregiver 18. In this way, the care receiver 7 is assisted on the basis of the decision made by the caregiver 18. Note that if the robot system 1 automatically halts, the power is not turned off. The robot system 1 may halt at the position and deny an operation other than brake-on and brake-off. In this manner, the arms can be prevented from being folded (refer to FIG. 8A) with the care receiver 7 being connected to the robot system 1.

In step S408, the control unit 12 detects whether the battery level acquired in step S404 during the operation of the arm mechanism 4 is lower than or equal to the first threshold value for any one of the standing-up motion, the sitting-down motion, and the walking motion. If the control unit 12 detects that the battery level is lower than or equal to the first threshold value for any one of the motions, the processing proceeds to step S409. However, if the control unit 12 does not detect that the battery level is lower than or equal to the first threshold value for any one of the motions, that is, if the battery level is higher than the first threshold value for any one of the motions, the processing proceeds to step S411.

In step S409, the control unit 12 determines the operation availability index for supporting the care receiver 7 with the motion on the basis of the battery level acquired in step S404. Note that since a particular example of the amount of energy charge used for the determination and a particular example of the operation availability index are the same as those in step S108, detailed description of the particular examples are not repeated.

In step S410, support with the sitting-down motion by the robot 20 is completed.

In step S411, the presentation unit 10 presents the number of times that support with the standing-up motion or the sitting-down motion can be provided. After the process performed in step S411 is completed, the sitting-down process is completed.

In step S412, support with the sitting-down motion by the robot 20 is completed.

In step S413, as illustrated in FIG. 7C, the presentation unit 10 presents a message stating that the battery level of the battery 21 is sufficient and, thus, the number of times or the duration that support with the standing-up or sitting-down motion can be provided need not be taken into account. After the process performed in step S413 is completed, the sitting down process is completed.

Note that in step S411 illustrated in FIG. 7B, the number of times that support with the standing-up motion or the sitting-down motion can be provided is presented. Instead of presenting the number of times, the presentation unit 10 may present the duration that support with the standing-up motion or the sitting-down motion can be provided, as illustrated in FIG. 7F. In this example, if the "Down" button 6c is pressed and, thereafter, is released, the robot system 1 operates so that the care receiver 7 moves from the standing posture to the sitting posture. However, the robot system 1 may operate only when the "Down" button 6c is being pressed. If the "Down" button 6c is released, the robot system 1 may halt. In such a case, the "Down" button 6c can be turned on and off a plurality of times before the sitting-down motion is completed. Thus, the control unit 12 cannot detect the point in time at which the sitting-down motion is completed. Accordingly, instead of the number of times that support can be provided, the presentation unit 10 may present the duration that support can be provided when the "Down" button 6c is turned off (refer to FIG. 7F).

Through the processes in the above-described steps, the sitting down process is completed.

While the above description has been given with reference to the first motion pattern representing the motion pattern of the arm mechanism 4 of the robot 20 that supports the care receiver 7 with the standing-up motion and the second motion pattern representing the motion pattern of the arm mechanism 4 of the robot 20 that supports the care receiver 7 with the sitting-down motion, the motion patterns are not limited thereto. For example, a motion pattern of the care receiver 7 who sits on a bed, moves from the bed to a toilet, and moves back to the bed can be generated. Let a fourth motion pattern and a fifth motion pattern be two patterns included in the generated motion pattern. Then, the fourth motion pattern is a motion pattern of the arm mechanism 4 for supporting the care receiver 7 with the motion to move from the bed to the toilet. The motion to move from the bed to the toilet is formed from a series of motions of the arm mechanism 4 performed when the care receiver 7 stands up from the bed, walks to a toilet, and sits down on the toilet. The fifth motion pattern is, for example, a motion pattern of the arm mechanism 4 for supporting the care receiver 7 with motions performed when the care receiver 7 moves back from the toilet to the bed. The motion to move back from the toilet to the bed is formed from a series of motions of the arm mechanism 4 performed when the care receiver 7 stands up from the toilet, walks to the bed, and sits down on the bed. In such a case, a series of motions of the care receiver 7 performed when the care receiver 7 sitting on the bed moves to the toilet and moves back to the bed corresponds to a multiple-motion pattern. That is, the multiple-motion pattern include two first motion patterns of the arm mechanism 4 used by the robot 20 to support the care receiver 7 with the standing-up motion and two motion patterns of the arm mechanism 4 used by the robot 20 to support the care receiver 7 with the sitting-down motion.

When the arm mechanism 4 operates in accordance with the multiple-motion pattern, the following operations are performed. That is, the arm mechanism 4 performs an operation in accordance with the first one of the two first motion patterns (i.e., a first operation for supporting with the sitting-down motion). Thereafter, the arm mechanism 4 performs an operation in accordance with the first one of the two second motion patterns (i.e., a first operation for supporting with the sitting-down motion). Subsequently, the arm mechanism 4 performs an operation in accordance with the second one of the two first motion patterns (i.e., a second operation for supporting with the standing-up motion). Thereafter, the arm mechanism 4 performs an operation in accordance with the second one of the second motion patterns (i.e., a second operation for supporting with the sitting-down motion). Note that in the multiple motions, the standing-up motion represents an entire motion which start in the sitting posture and finishes in the standing posture, and the sitting-down motion represents an entire motion which start in the standing posture and finishes in the sitting posture. When the care receiver 7 is currently walking after the arm mechanism 4 starts operating in accordance with the multiple-motion pattern, the arm mechanism 4 performs one of the following two operations (an operation in a first case and an operation in a second case) before the arm mechanism 4 completes the operation in accordance with the multiple-motion pattern. That is, the operation in the first case includes a first operation for supporting with a sitting-down motion, a second operation for supporting with a standing-up motion, and a second operation for supporting with a sitting-down motion. In contrast, the operation in the second case includes a second operation for supporting with a sitting-down motion. Note that in this example, an operation for supporting with a walking motion is not taken into account. Accordingly, when the arm mechanism 4 operates in accordance with the multiple-motion pattern, the amount of energy charge required for the operation performed before the arm mechanism 4 completes the operation varies depending on whether the care receiver 7 is walking. The amount of energy charge required for the operation performed by the arm mechanism 4 in the first case is greater than that in the second case. The amount of energy charge required from the time the arm mechanism 4 starts operating in accordance with the multiple-motion pattern to the time the arm mechanism 4 completes the operation is greater than that required for the operation in the first case.

Between step S103 and step S104, the control unit 12 may acquire, from a sensor, information as to whether the care receiver 7 is walking. The information as to whether the care receiver 7 is walking is information as to whether the walking mechanism 14 is operating and, thus, the main body mechanism 2 is moving. For example, the control unit 12 acquires information from an angular velocity sensor disposed in the front wheel 14*a* or the rear wheel 14*b* of the walking mechanism 14, an acceleration sensor disposed in the main body mechanism 2, or an acceleration sensor disposed on the care receiver 7 and determines whether the main body mechanism 2 is moving. If the angular velocity sensor detects a value greater than or equal to a predetermined value, it can be determined that the front wheels 14*a* or the rear wheels 14*b* are rotating. Alternatively, if the acceleration sensor detects a value greater than or equal to a predetermined value, it can be determined that the main body mechanism 2 or the care receiver 7 is moving.

The control unit 12 sets the second threshold value used when the main body mechanism 2 is moving to a value lower than the second threshold value used when the main body mechanism 2 is not moving on the basis of the information acquired from the sensors. For example, when the main body mechanism 2 is not moving, it is assumed that the care receiver 7 is on a bed and is about to go to a toilet. At that time, the multiple-motion pattern includes two standing-up motions and two sitting-down motions. In contrast, when the care receiver 7 is walking, the multiple-motion pattern includes one sitting-down motion or a set of one standing-up motion and two sitting-down motions. That is, the number of operations is smaller than that when the main body mechanism 2 is not moving. Accordingly, when the care receiver 7 is walking, it is considered that the care receiver 7 has already performed some of the multiple motions. Some of the multiple motions means a standing-up motion from a bed or a set of a standing-up motion from a bed, a walking motion from the bed to a toilet, a motion to sit on a toilet, and a standing-up motion from the toilet. The amount of energy charge required for supporting with the multiple-motion pattern when the care receiver 7 is moving is smaller than that when the care receiver 7 is not moving. Accordingly, the control unit 12 corrects the second threshold value. In step S104 illustrated in FIG. 10, the control unit 12 compares the corrected second threshold value with the battery level. In this manner, information regarding the battery level corresponding to the conditions of the care receiver 7 can be presented.

Modification of Exemplary Embodiment

Figure 14:
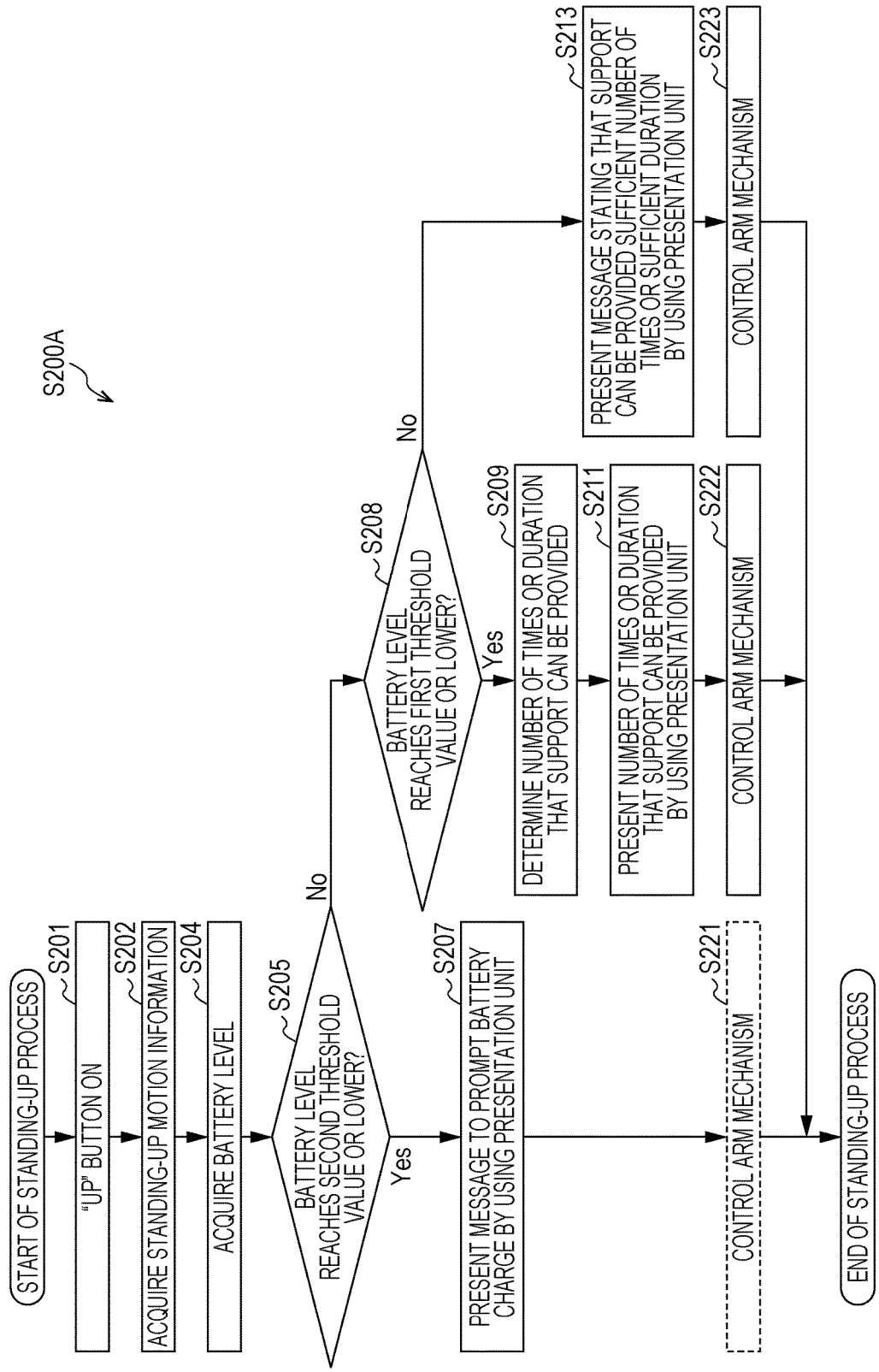
FIG. 14 is a flow diagram illustrating a standing up process performed by a robot system according to a modification of the exemplary embodiment.

FIG. 14 is a flow diagram illustrating a standing up process performed by a robot system 1 according to a modification of the present exemplary embodiment. The standing up process (step S200A), which is a series of sub-processes illustrated in FIG. 14, is performed by the robot system 1, instead of the standing up process (step S200) according to the present exemplary embodiment illustrated in FIG. 11. Although the standing up process (step S200A) according to the modification is similar to the standing up process (step S200) according to the present exemplary embodiment, the timings at which the robot system 1 controls the arm mechanism 4 differ from those in the present exemplary embodiment.

That is, as illustrated in FIG. 14, upon receiving an operation performed by the user, such as an operation to press the "Up" button 6*b*, the robot system 1 acquires standing-up motion information (steps S201 and S202). Subsequently, instead of controlling the arm mechanism 4, the robot system 1 acquires the battery level via the control unit 12 and presents information by using the presentation unit 10 on the basis of comparison of the acquired battery level and each of the second threshold value and the first threshold value (steps S204, S205, S207, S211, and S213). More specifically, before the robot system 1 instructs the arm mechanism 4 to operate in accordance with the operation received in step S201 (i.e., support with a standing-up motion), the robot system 1 determines whether the battery level is lower than or equal to the second threshold value or the first threshold value on the basis of comparison during the operation. Thereafter, the robot system 1 causes the arm mechanism 4 to operate to support the care receiver 7 with the standing-up motion (steps S221, S222, and S223).

In this manner, the robot system 1 can present information based on the battery level to the caregiver 18 or the care receiver 7 before starting the operation of the arm mechanism 4. Thus, the robot system 1 can prompt the caregiver 18 or the care receiver 7 to charge the battery as needed. Accordingly, if it is difficult to operate the arm mechanism 4 using the current amount of battery charge, the caregiver 18 or the care receiver 7 can determine that the care receiver 7 does not operate the arm mechanism 4 to stand up.

Figure 15:
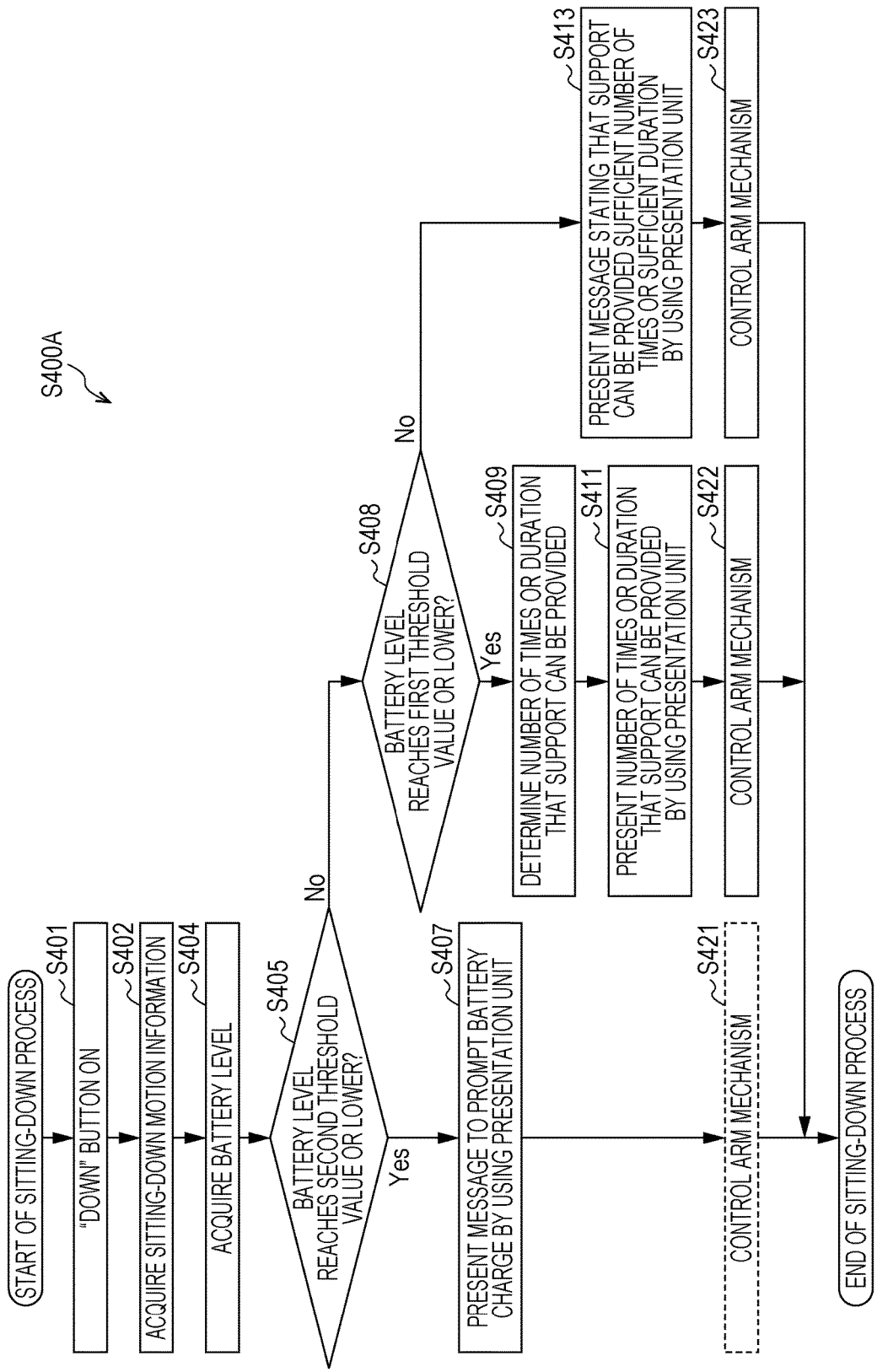
FIG. 15 is a flow diagram illustrating a sitting down process performed by the robot system according to the modification of the exemplary embodiment.

FIG. 15 is a flow diagram illustrating a sitting down process performed by a robot system 1 according to the modification of the present exemplary embodiment. The sitting down process (step S400A), which is a series of sub-processes illustrated in FIG. 15, is performed by the robot system 1 instead of the sitting down process (step S400) according to the present exemplary embodiment illustrated in FIG. 13. Although the sitting down process (step S400A) is similar to the sitting down process (step S400) according to the present exemplary embodiment, the timings at which the robot system 1 controls the arm mechanism 4 differ from those in the present exemplary embodiment.

That is, as illustrated in FIG. 15, upon receiving an operation performed by the user, such as an operation to press the "Down" button 6c, the robot system 1 acquires sitting-down motion information (steps S401 and S402). Subsequently, instead of controlling the arm mechanism 4, the robot system 1 acquires the battery level via the control unit 12 and presents information by using the presentation unit 10 on the basis of comparison of the acquired battery level and each of the second threshold value and the first threshold value (steps S404, S405, S407, S411, and S413). More specifically, before the robot system 1 instructs the arm mechanism 4 to operate in accordance with the operation received in step S401 (i.e., support with a sitting-down motion), the robot system 1 determines whether the battery level is lower than or equal to the second threshold value or the first threshold value on the basis of comparison during the operation. Thereafter, the robot system 1 causes the arm mechanism 4 to operate to support the care receiver 7 with the sitting-down motion (steps S421, S422, and S423).

In this manner, the robot system 1 can present information based on the battery level to the caregiver 18 or the care receiver 7 before starting the operation of the arm mechanism 4. Thus, the robot system 1 can prompt the caregiver 18 or the care receiver 7 to charge the battery as needed. Accordingly, if it is difficult to operate the arm mechanism 4 using the current amount of battery charge, the caregiver 18 or the care receiver 7 can determine that the care receiver 7 does not operate the arm mechanism 4 to sit down.

As described above, if the battery level reaches the first threshold value or lower, the robot 20 according to the present exemplary embodiment presents the operation availability index for any one of the first motion pattern, the second motion pattern, and the multiple-motion pattern. For example, if the number of times is presented as the index, the number of times that the operation in accordance with each of the operation patterns is presented. In this manner, the care receiver can easily determine whether the amount of battery charge sufficient to move to a toilet is remaining in the battery. As a result, the care receiver can easily make a plan of when to recharge the battery. For example, the care receiver can recharge the battery in advance before moving to a toilet.

Note that in the above-described exemplary embodiments, each of the constituent elements may be configured as dedicated hardware or may be achieved by executing a software program suitable for the constituent element. Each of the constituent elements may be achieved by a program execution unit, such as a central processing unit (CPU) or a processor, reading the software program stored in a recording medium, such as a hard disk or a semiconductor memory, and executing the software program. In this case, the software that provides the robots according to the exemplary embodiments is a program described below.

That is, the program causes a computer to execute a method for controlling a robot is provided. The robot includes a motion mechanism capable of operating in accordance with each of a first motion pattern for supporting a care receiver with a first motion and a second motion pattern for supporting the care receiver with a second motion and a power source that supplies electric power to the motion mechanism. The method includes determining at least one of a first index indicating the availability of an operation in accordance with the first motion pattern, a second index indicating the availability of an operation in accordance with the second motion pattern, and a multiple-motion support operation availability index indicating the availability of an operation in accordance with a multiple-motion pattern including the first motion pattern and the second motion pattern on the basis of the level of energy charge in the power source, the amount of energy charge required for the operation performed by the motion mechanism in accordance with the first motion pattern, and the amount of energy charge required for the operation performed by the motion mechanism in accordance with the second motion pattern if it is detected that the energy charge in the power source is lower than or equal to a first threshold value, and presenting at least one of the determined indices.

While the robots according to one or more aspects have been described with reference to exemplary embodiments, the present disclosure is not limited to the exemplary embodiments. A variety of modifications of the embodiments made by those skilled in the art and embodiments carried out by combining the constituent elements in different embodiments without departing from the spirit and scope of the present disclosure may be encompassed within the one or more aspects.

According to the present disclosure, a robot that supports a care receiver with a motion while preventing unexpected battery depletion during use can be provided.

What is claimed is:

1. A robot comprising:
a motion mechanism configured to operate in accordance with each of a first motion pattern for supporting a user with a first motion representing a standing-up motion and a second motion pattern for supporting the user with a second motion representing a sitting-down motion;
a power source that supplies electric energy to the motion mechanism;
a controller that determines a multiple-motion support operation availability index indicating the availability of an operation performed by the motion mechanism in accordance with a multiple-motion pattern including the first motion pattern and the second motion pattern based on a level of energy charge in the power source, an amount of energy charge required for a first operation performed by the motion mechanism in accordance with the first motion pattern, and an amount of energy charge required for a second operation performed by the motion mechanism in accordance with the second motion pattern when the controller detects that the level of energy charge in the power source is lower than or equal to a first threshold value; and
a display that presents the multiple-motion support operation availability index determined by the controller.

2. The robot according to claim 1, wherein when the controller detects that the level of energy charge in the power source is lower than or equal to the first threshold value during the first operation or the second operation, the display presents the multiple-motion support operation availability index determined by the controller after the first motion or the second motion is completed.

3. The robot according to claim 1, wherein when the controller detects that the level of energy charge in the power source is lower than or equal to the first threshold value during the first operation or the second operation before either operation is performed, the display presents at least one of indices determined by the controller before either operation is performed.

4. The robot according to claim 1, wherein the motion mechanism is further capable of operating in accordance with a third motion pattern for supporting the user with a third motion,
- herein when the controller detects that the level of energy charge in the power source reaches a value lower than or equal to a second threshold value that is lower than the first threshold value during the first operation or the second operation, the controller halts the first operation or the second operation and causes the motion mechanism to operate in accordance with the third motion pattern, and
- wherein the third motion pattern includes a motion pattern to temporarily maintain a position of the motion mechanism.

5. The robot according to claim 4, wherein the second threshold value is lower than the amount of energy charge required for the first operation or is lower than the an amount of energy charge required for the second operation, and is higher than or equal to an amount of energy charge required to perform an operation by the motion mechanism in accordance with the third motion pattern.

6. The robot according to claim 5, wherein the controller further acquires sensor information from a sensor attached to one of the motion mechanism and the user, and
- wherein the controller sets the second threshold value used when the motion mechanism is moving to a value that is lower than the second threshold value used when the motion mechanism is not moving.

7. The robot according to claim 1, wherein the multiple-motion support operation availability index represents the number of times that the motion mechanism is operable in accordance with the multiple-motion pattern by using the energy charge remaining in the power source when the controller acquires the level of the energy charge.

8. The robot according to claim 1, wherein the multiple-motion support operation availability index represents a duration that the motion mechanism is operable in accordance with the multiple-motion pattern using the energy charge remaining in the power source when the controller acquires the level of the energy charge.

9. The robot according to claim 1, wherein the multiple-motion support operation availability index represents information as to whether the motion mechanism is operable at least once or is inoperable in accordance with the multiple-motion pattern by using the energy charge remaining in the power source when the controller acquires the level of the energy charge.

10. The robot according to claim 1, further comprising:
- an input receiver that receives an input for causing the motion mechanism to operate in accordance with one of the first motion pattern and the second motion pattern,
- wherein when the input receiver receives the input, the motion mechanism operates in accordance with part of the first motion pattern or part of the second motion pattern determined by the received input,
- wherein upon detecting that the level of energy charge in the power source reaches a value lower than or equal to the first threshold value, the controller determines at least one of the indices; and
- wherein the display presents the multiple-motion support operation availability index.

11. The robot according to claim 10, further comprising:
- a movement mechanism that moves the robot; and
- a brake that prevents the movement mechanism from moving,
- wherein the display presents the multiple-motion support operation availability index when the brake prevents the movement mechanism from moving or when the brake finishes the prevention.

12. A method for controlling a robot, the robot including a motion mechanism configured to operate in accordance with each of a first motion pattern for supporting a user with a first motion representing a standing-up motion and a second motion pattern for supporting the user with a second motion representing a sitting-down motion and a power source that supplies electric energy to the motion mechanism, the method comprising:
- determining a multiple-motion support operation availability index indicating the availability of an operation performed by the motion mechanism in accordance with a multiple-motion pattern including the first motion pattern and the second motion pattern based on the level of energy charge in the power source, an amount of energy charge required for a first operation performed by the motion mechanism in accordance with the first motion pattern, and an amount of energy charge required for a second operation performed by the motion mechanism in accordance with the second motion pattern when the controller detects that the level of energy charge in the power source is lower than or equal to a first threshold value; and
- displaying the determined multiple-motion support operation availability index.

13. A non-transitory computer-readable recording medium storing a control program, the control program causing an apparatus including a processor to perform a process, the process being a method for controlling a robot including a motion mechanism configured to operate in accordance with each of a first motion pattern for supporting a user with a first motion representing a standing-up motion and a second motion pattern for supporting the user with a second motion representing a sitting-down motion and a power source that supplies electric energy to the motion mechanism, the method including:
- determining a multiple-motion support operation availability index indicating the availability of an operation performed by the motion mechanism in accordance with a multiple-motion pattern including the first motion pattern and the second motion pattern based on the level of energy charge in the power source, an amount of energy charge required for a first operation performed by the motion mechanism in accordance with the first motion pattern, and an amount of energy charge required for a second operation performed by the motion mechanism in accordance with the second motion pattern when the controller detects that the level of energy charge in the power source is lower than or equal to a first threshold value; and
- displaying the determined multiple-motion support operation availability index.

* * * * *